US011906873B2

(12) United States Patent
Argyris et al.

(10) Patent No.: US 11,906,873 B2
(45) Date of Patent: Feb. 20, 2024

(54) SERIAL DATA CONVERSION REDUNDANCY USING OPTICAL MODULATORS

(71) Applicant: Mellanox Technologies, Ltd., Yokneam (IL)

(72) Inventors: Nikos Argyris, Zografou (GR); Paraskevas Bakopoulos, Ilion (GR); Dimitrios Kalavrouziotis, Papagou (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 151 days.

(21) Appl. No.: 17/694,159

(22) Filed: Mar. 14, 2022

(65) Prior Publication Data
US 2023/0213835 A1 Jul. 6, 2023

(30) Foreign Application Priority Data
Jan. 5, 2022 (GR) .............................. 20220100005

(51) Int. Cl.
*G02F 1/21* (2006.01)
*G02F 1/225* (2006.01)
*H04B 10/50* (2013.01)

(52) U.S. Cl.
CPC ............ *G02F 1/212* (2021.01); *G02F 1/225* (2013.01); *H04B 10/505* (2013.01)

(58) Field of Classification Search
None
See application file for complete search history.

(56) References Cited

U.S. PATENT DOCUMENTS 6,160,647 A * 12/2000 Gilliland ................ H05K 1/141
398/1
6,204,951 B1 * 3/2001 Coward .................. G02F 1/225
398/9

(Continued)

FOREIGN PATENT DOCUMENTS

WO       2022200292 A1    9/2022

OTHER PUBLICATIONS

Ackermann, M. et al., "Sub-wavelength tunneling barrier in rib waveguide microring modulators with vanishing bending losses," Opt. Lett. 47, 2626-2629 (2022).

(Continued)

*Primary Examiner* — Andrew Jordan
(74) *Attorney, Agent, or Firm* — Moore & Van Allen PLLC; Michael M. McCraw

(57) ABSTRACT

Embodiments are disclosed for providing a serializer and/or a deserializer with redundancy using optical modulators. An example system includes an MZM structure that comprises a first waveguide interferometer arm structure and a second waveguide interferometer arm structure. The first waveguide interferometer arm structure comprises a first segmented electrode associated with at least a first electrode and a second electrode. The second waveguide interferometer arm structure comprises a second segmented electrode associated with at least a third electrode and a fourth electrode. The MZM structure is configured to convert an optical input signal into an optical output signal through application of a digital data signal to the first electrode and the third electrode, and application of a redundant digital data signal to the second electrode and the fourth electrode.

20 Claims, 8 Drawing Sheets

(56) References Cited

U.S. PATENT DOCUMENTS

| | | | |
|---|---|---|---|
| 6,271,950 B1* | 8/2001 | Hansen | H04B 10/572 398/154 |
| 6,345,131 B1 | 2/2002 | Jang | |
| 6,469,649 B1* | 10/2002 | Helkey | H03M 1/1245 341/143 |
| 7,010,230 B2* | 3/2006 | Lee | H04J 14/08 398/53 |
| 7,171,116 B2* | 1/2007 | Korotky | H04B 10/5053 398/16 |
| 7,409,123 B1 | 8/2008 | Feng | |
| 7,542,641 B1 | 6/2009 | Asghari | |
| 7,646,979 B1* | 1/2010 | Ciancaglini | H04J 14/0246 398/70 |
| 7,658,552 B2 | 2/2010 | Asghari | |
| 7,787,713 B2* | 8/2010 | Roberts | H04B 10/505 385/3 |
| 7,876,491 B2* | 1/2011 | Ide | H04B 10/5561 359/279 |
| 7,917,035 B2 | 3/2011 | Asghari | |
| 8,090,231 B1 | 1/2012 | Asghari | |
| 8,149,492 B2* | 4/2012 | Ghidini | G02F 1/0123 359/279 |
| 8,160,404 B2 | 4/2012 | Pan | |
| 8,242,432 B2 | 8/2012 | Feng | |
| 8,346,028 B2 | 1/2013 | Feng | |
| 8,411,260 B1 | 4/2013 | Feng | |
| 8,463,088 B1 | 6/2013 | Asghari | |
| 8,472,759 B2* | 6/2013 | Sugiyama | G02F 1/0123 385/3 |
| 8,476,576 B2 | 7/2013 | Dong | |
| 8,526,769 B1 | 9/2013 | Feng | |
| 8,638,485 B2 | 1/2014 | Feng | |
| 8,724,100 B1 | 5/2014 | Asghari | |
| 8,728,837 B2 | 5/2014 | Fong | |
| 8,737,772 B2 | 5/2014 | Dong | |
| 8,817,354 B2 | 8/2014 | Feng | |
| 8,897,606 B2 | 11/2014 | Asghari | |
| 8,965,208 B2 | 2/2015 | Asghari | |
| 8,989,522 B2 | 3/2015 | Qian | |
| 9,025,241 B2 | 5/2015 | Asghari | |
| 9,128,348 B1* | 9/2015 | Yamazaki | H04B 10/588 |
| 9,142,698 B1 | 9/2015 | Cunningham | |
| 9,217,831 B1 | 12/2015 | Asghari | |
| 9,217,836 B2 | 12/2015 | Asghari | |
| 9,244,327 B2 | 1/2016 | Prosyk | |
| 9,274,353 B1 | 3/2016 | Dong | |
| 9,279,936 B2 | 3/2016 | Qian | |
| 9,312,960 B1 | 4/2016 | Feng | |
| 9,379,515 B1 | 6/2016 | Asghari | |
| 9,588,294 B2 | 3/2017 | Fong | |
| 9,702,278 B2 | 7/2017 | Gruener | |
| 9,798,166 B1 | 10/2017 | Sharma | |
| 9,804,475 B1* | 10/2017 | Parker | H01P 3/026 |
| 9,966,733 B2 | 5/2018 | Feng | |
| 9,991,965 B2 | 6/2018 | Christensen | |
| 10,007,167 B1* | 6/2018 | Parker | H01L 27/14625 |
| 10,031,355 B2 | 7/2018 | Feng | |
| 10,078,232 B1 | 9/2018 | Vermeulen | |
| 10,241,379 B1* | 3/2019 | Parker | H01L 27/14625 |
| 10,288,805 B2 | 5/2019 | Luff | |
| 10,330,864 B2 | 6/2019 | Asghari | |
| 10,394,060 B2 | 8/2019 | Mentovich | |
| 10,649,244 B1 | 5/2020 | Mentovich | |
| 10,895,797 B2 | 1/2021 | Cavaliere | |
| 10,976,637 B2* | 4/2021 | Parker | H01L 27/14625 |
| 11,119,380 B2* | 9/2021 | Giaretta | G02F 1/2255 |
| 11,275,287 B2* | 3/2022 | Ogiso | G02B 6/12 |
| 11,397,363 B2 | 7/2022 | Kawakami | |
| 11,604,396 B2* | 3/2023 | Giaretta | G02F 1/2255 |
| 11,668,994 B2* | 6/2023 | Parker | H01P 3/026 385/3 |
| 11,711,147 B2* | 7/2023 | Argyris | H04B 10/503 398/135 |
| 11,736,201 B2* | 8/2023 | Tanaka | H04B 10/524 398/17 |
| 2004/0052518 A1* | 3/2004 | Korotky | H04B 10/5053 398/2 |
| 2004/0208414 A1* | 10/2004 | Lee | H04J 14/08 385/24 |
| 2006/0159384 A1* | 7/2006 | Sugiyama | G02F 1/0356 385/14 |
| 2007/0212076 A1* | 9/2007 | Roberts | H04B 10/5053 398/183 |
| 2009/0003841 A1* | 1/2009 | Ghidini | G02F 1/2257 398/186 |
| 2009/0086303 A1* | 4/2009 | Ide | H04B 10/5053 359/279 |
| 2010/0330727 A1 | 12/2010 | Hill | |
| 2011/0188799 A1* | 8/2011 | Sugiyama | G02F 1/0123 385/3 |
| 2012/0251029 A1 | 10/2012 | Kobrinsky | |
| 2012/0251032 A1* | 10/2012 | Kato | G02F 1/0327 385/3 |
| 2013/0182305 A1 | 7/2013 | Feng | |
| 2015/0010263 A1 | 1/2015 | Fong | |
| 2015/0055911 A1 | 2/2015 | Bowers | |
| 2015/0261059 A1* | 9/2015 | Yamazaki | H04B 10/5051 385/3 |
| 2017/0269391 A1 | 9/2017 | Feng | |
| 2017/0351124 A1 | 12/2017 | Roth | |
| 2018/0314128 A1 | 11/2018 | Sun | |
| 2019/0171084 A1* | 6/2019 | Parker | G02F 1/2257 |
| 2019/0179177 A1 | 6/2019 | Rickman | |
| 2019/0293971 A1 | 9/2019 | Yu | |
| 2020/0012043 A1 | 1/2020 | Abediasl | |
| 2020/0096834 A1* | 3/2020 | Giaretta | G02F 1/2255 |
| 2020/0124878 A1 | 4/2020 | Yu | |
| 2021/0191164 A1 | 6/2021 | Mentovich | |
| 2021/0215992 A1* | 7/2021 | Parker | H01L 27/14625 |
| 2021/0232016 A1* | 7/2021 | Ogiso | G02B 6/12 |
| 2021/0336418 A1 | 10/2021 | Iakovlev | |
| 2021/0373411 A1* | 12/2021 | Giaretta | G02F 1/2255 |
| 2022/0019120 A1* | 1/2022 | Sobu | G02F 1/0121 |
| 2022/0236619 A1 | 7/2022 | Hoessbacher | |
| 2022/0269113 A1* | 8/2022 | Okamoto | G02F 1/0123 |
| 2022/0329322 A1* | 10/2022 | Argyris | H04B 10/40 |
| 2022/0337321 A1 | 10/2022 | Argyris | |
| 2023/0018578 A1 | 1/2023 | Bakopoulos | |
| 2023/0019673 A1* | 1/2023 | Tanaka | H04B 10/524 |
| 2023/0163854 A1* | 5/2023 | Zhou | G02B 27/283 398/140 |
| 2023/0213835 A1* | 7/2023 | Argyris | H04B 10/505 385/3 |
| 2023/0305356 A1* | 9/2023 | Jacques | G02F 1/2257 385/3 |

OTHER PUBLICATIONS

Akiyama, S. et al. "Cascaded-ring-resonator-loaded Mach-Zehnder modulator for enhanced modulation efficiency in wide optical bandwith," Opt. Expr. 20, 16321-16338 (2012) . . . .

Akiyama, Suguru et al. "InP-Based Mach-Zehnder Modulator With Capacitively Loaded Travelling-Wave Electrodes," Journal of Lightwave Technology, vol. 26, No. 5, Mar. 1, 2008, pp. 608-615, DOI: 10.1109/JLT.2007.915278.

Bin Wang et al. (2022), "Principles of Selective Area Epitaxy and Applications in III-V Semiconductor Lasers Using MOCVD: A Review," Crystals 2022, 12(7), 1011.

Chacinski, Marck et al. "Monolithically Integrated 100 GHz DFB-TWEAM," Journal of Lightwave Technology, vol. 27, No. 16, Aug. 15, 2009, pp. 3410-3415, DOI: 10.1109/JLT.2009.2015773. Available online: URL: https://opg.optica.org/jlt/abstract.cfmuri=jlt-27-16-3410.

Cui, Yansong et al. "Modeling and Design of GaAs Traveling-Wave electrooptic Modulators Based On Capacitively Loaded Coplanar Strips," Journal of Lightwave Technology, vol. 24, No. 1, Jan. 2006, pp. 544-554, DOI: 10.1109/JLT.2005.859851.

(56) References Cited

OTHER PUBLICATIONS

D. A. B. Miller et al. (1984), "Band-Edge Electroabsorption in Quantum Well Structures: The Quantum-Confined Stark Effect," Phys. Rev. Lett. 53, 2173.
Han, C. et al., "Recent progress in silicon-based slow-light electro-optic modulators," Micromachines 13, 400 (2022).
Han, C. et al., "Ultra-compact silicon modulator with 110 GHz bandwith," in Proc. Opt. Fib. Comm. Conf. (OFC), (Optica Publishing Group, Washington, D.C. 2022), p. Th4C.5.
Horikawa, T. et al., "A 300-nm silicon photonics platform for large-scale device integration," J. Sel. Top. Quant. Electron, 24, 8200415 (2018).
Hou et al. (2010), "Monolithic 40 GHz passively Mode-locked AlGaInAs/InP 1.55 mm MQW Laser with Surface-etched Bragg Gratings," European Conference on Integrated Optics (ECIO 10).
J. Yan, T. Yeh, Y. Chang, Y. Wu, and K. Feng, "DSP Equalization-free Data Center Communication with High Dispersion Tolerant Optical Duobinary-PAM4 Signal," in Conference on Lasers and Electro-Optics, OSA Technical Digest (online) (Optical Society of America, 2017), paper SF1L.4.
Jafari, O. et al., "Mach-Zehnder silicon photonic modulator assisted by phase-shifted bragg gratings," Photon. Technol. Lett. 32, 445-448 (2020).
K. Yonenaga and S. Kuwano, "Dispersion-Tolerant Optical Transmission System Using Duobinary Transmitter and Binary Receiver," IEEE J. Lightwave Technol., vol. 15, No. 8, pp. 1530-1537, 1997.
Klein, H.N. et al. "1.55 μm Mach-Zehnder Modulators On InP For Optical 40/80 Gbit/s Transmission Networks," In 2006 International Conference on Indium Phosphide and Related Materials Conference Proceedings, May 8, 2006, pp. 171-173, IEEE.
Lange, Sophie et al. "100 GBd Intensity Modulation and Direct Detection With An InP-Based Monolithic DFB Laser Mach-Zehnder Modulator," Journal of Lightwave Technology, vol. 36, No. 1, Jan. 1, 2018, pp. 97-102.
Lange, Sophie et al. "Low Switching Voltage Mach-Zehnder Modulator Monolithically Integrated With DFB Laser For Data Transmission Up To 107.4 GB/s," Journal of Lightwave Technology, vol. 34, No. 2, Jan. 15, 2016, pp. 401-406, DOI: 10.1109/JLT.2015.2496426.
Li, G.L. et al. "Analysis Of Segmented Traveling-Wave Optical Modulators," Journal of Lightwave Technology, vol. 22, No. 7, Jul. 2004, pp. 1789-1796, DOI: 10.1109/JLT.2004.831179. Available online: URL: https://opg.optica.org/jlt/abstract.cfmuri=jlt-22-7-1789.
Li, G.L. et al. "Numerical Modeling Of Segmented Traveling-Wave Electroabsorption Modulators," In 2004 IEE MTIT-S International Microwave Symposium Digest (IEEE Cat. No. 04CH37535), Jun. 6, 2004, vol. 2, pp. 773-776, IEEE.
Margalit, N. et al., "Perspectives on the future of silicon photonics and electronics," Appl. Phys. Lett. 118, 220501 (2021).

Nakai, Y. et al. (2019), "Uncooled Operation of 53-GBd PAM4 (106-GB/s) EA/DFB Lasers With Extremely Low Drive Voltage With 0.9 Vpp," Journal of Lightwave Technology, vol. 37, Issue 7, pp. 1658-1662.
Nan Qi et al., Co-Design and Demonstration of a 25 Gbps Silicon-Photonic Mach Zehnder Modulator with a CMOS Based High Swing Driver, IEEE, Nov. 2016, pp. 1-11 (Year: 2016).
Ogiso, Yoshihiro et al. "Over 67 GHZ Bandwidth and 1.5 V Vp InP-Based Optical IQ Modulator With n-i-p-n Heterostructure," Journal of Lightwave Technology, vol. 35, No. 8, Apr. 15, 2017, pp. 1450-1455, DOI: 10.1109/JLT.2016.2639542.
Qian, Guang et al. "CL-TWE Mach-Zehnder Electro-Optic Modulator Based On InP-MQW Optical Waveguides," Chinese Optics Letters, vol. 17, No. 6, Jun. 2019, pp. 061301-1-061301-5, DOI: 10.3788/COL201917.061301.
Romero-Garcia, Sebastian et al., "High-speed resonantly enhanced silicon photonics modulator with a large operating temperature range", Optic Letters, vol. 42, Issue 1, pp. 81-84 (2017). https://doi.org/10.1364/OL.42.000081.
Sharif Azadeh, S. et al., "Low Vp silicon photonics modulators with highly linear epitaxially grown phase shifters," Opt. Expr. 23, 23526-23550 (2015).
Stepanenko, M. et al. "Optimization of RF Electrodes For Electro-Optic Modulator Based On Quantum-Confined Stark Effect," In Journal of Physics: Conference Series 2019, vol. 1145, No. 1:012028, pp. 1-6, IOP Publishing.
Stepanenko, Mikhail et al. "Multi-Parameter Optimization Of An InP Electro-Optic Modulator," Symmetry, vol. 12, Nov. 21, 2020, pp. 1-18, DOI: 10.3390/sym12111920.
Tamura, M. et al. (2003), "High-speed electroabsorption modulators using ruthenium-doped SI—InP: impact of Interdiffusion-free burying technology on E/O modulation characteristics," International Conference on Indium Phosphide and Related Materials, 2003. pp. 491-494.
Terada, Y. et al., "Full C-band Si photonic crystal waveguide modulator," Opt. Lett. 42, 5110-5112 (2017).
Velthaus, K.-O. et al. "High Performance InP-Based Mach-Zehnder Modulators For 10 to 100 GB/s Optical Fiber Transmission Systems," 23rd International Conference On Indium Phosphide and Related Materials—IPRM 2011, May 22-26, 2011, (4 pages), Berlin, Germany.
Wang, Gary et al. "Low Vp, High Bandwidth, Small Form Factor InP Modulator," in 2014 IEEE Avionics, Fiber-Optics and Photonics Technology Conference (AVFOP), Nov. 11, 2014, pp. 41-42, IEEE.
Witzens, J., "High-Speed silicon photonics modulators," Proc. IEEE 106, 2158-2182 (2017).
Yamazaki, Hiroshi et al. "IMDD Transmission At Net Data Rate of 333 Gb/s Using Over-100-GHz-Bandwidth Analog Multiplexer and Mach-Zehnder Modulator," Journal of Lightwave Technology, vol. 37, No. 8, Apr. 15, 2019, pp. 772-1778, DOI: 10.1109/JLT.2019.2898675.

\* cited by examiner

SERIAL DATA CONVERSION REDUNDANCY USING OPTICAL MODULATORS

CROSS REFERENCE TO RELATED APPLICATIONS

This application claims priority to and the benefit of Greek Application No. 20220100005, filed Jan. 5, 2022, the entirety of which is incorporated herein by reference.

TECHNOLOGICAL FIELD

Embodiments of the present invention relate generally to optical communications such as, for example, short-reach optical communications.

BACKGROUND

Optical communications have fundamentally enabled many advances in networks over the last decades. For example, because information no longer needs to be processed at the place where it has been harvested or generated, information can be transported to dedicated spaces for computation. As a result, cloud computing and edge computing are enabled and have changed the landscape of the Internet. The transfer of information between data centers or high-performance computing clusters (HPC), or intra-data center or intra-HPC, usually makes use of optical communication systems that require laser sources for generating the light channels. The light conveying the information can be generated either through external modulators (e.g., Mach-Zehnder modulators, micro-ring modulators, externally modulated lasers (EMLs)) or directly by the same device that generates the light (e.g., directly modulated lasers (DMLs) or vertical cavity surface emitting lasers (VCSELs)). However, Applicant has identified a number of deficiencies and problems associated with Mach-Zehnder modulators for optical communications. Through applied effort, ingenuity, and innovation, many of these identified problems have been solved by developing solutions that are included in embodiments of the present disclosure, many examples of which are described in detail herein.

BRIEF SUMMARY

Example embodiments of the present invention relate generally to a system(s) and apparatus to provide a serializer and/or a deserializer with redundancy using optical modulators. The details of some embodiments of the subject matter described in this specification are set forth in the accompanying drawings and the description below. Other features, aspects, and advantages of the subject matter will become apparent from the description, the drawings, and the claims.

In an embodiment, a Mach-Zehnder modulator (MZM) structure comprises a first waveguide interferometer arm structure and a second waveguide interferometer arm structure. The first waveguide interferometer arm structure comprises a first segmented electrode associated with at least a first electrode and a second electrode. The second waveguide interferometer arm structure comprises a second segmented electrode associated with at least a third electrode and a fourth electrode. Additionally, the MZM structure is configured to convert an optical input signal into an optical output signal through application of a digital data signal to the first electrode of the first waveguide interferometer arm structure and the third electrode of the second waveguide interferometer arm structure and application of a redundant digital data signal to the second electrode of the first waveguide interferometer arm structure and the fourth electrode of the second waveguide interferometer arm structure.

In one or more embodiments, the first segmented electrode and the second segmented electrode are configured to maintain a degree of power between the optical input signal and the optical output signal.

In one or more embodiments, a size of the first electrode corresponds to a size of the second electrode. In one or more embodiments, a bias of the first electrode corresponds to a bias of the second electrode.

In one or more embodiments, a size of the third electrode corresponds to a size of the fourth electrode. In one or more embodiments, a bias of the third electrode corresponds to a bias of the fourth electrode.

In one or more embodiments, the digital data signal is a first digital data signal. Furthermore, the first segmented electrode of the first waveguide interferometer further comprises a fifth electrode and the second segmented electrode of the second waveguide interferometer further comprises a sixth electrode. In one or more embodiments, the MZM structure is further configured to convert the optical input signal into the optical output signal through application of a second digital data signal to the fifth electrode of the first waveguide interferometer arm structure and the sixth electrode of the second waveguide interferometer arm structure.

In one or more embodiments, the optical output signal is an optical non-return-to-zero (NRZ) signal. In one or more embodiments, the optical output signal is an optical pulse amplitude modulation (PAM) signal.

In another embodiment, a system comprises a look-up table and an MZM structure. The look-up table is configured to provide an output digital data signal based on selection of a digital data signal or a redundant digital data signal. The MZM structure comprises a first waveguide interferometer arm structure and a second waveguide interferometer arm structure. The first waveguide interferometer arm structure comprises at least a first electrode. The second waveguide interferometer arm structure comprises at least a second electrode. Furthermore, the MZM structure is configured to convert an optical input signal into an optical output signal through application of the output digital data signal to the first electrode of the first waveguide interferometer arm structure and the second electrode of the second waveguide interferometer arm structure.

In one or more embodiments, the selection of the digital data signal or the redundant digital data signal is provided to maintain a degree of power between the optical input signal and the optical output signal.

In one or more embodiments, the first waveguide interferometer arm structure further comprises a third electrode and the second waveguide interferometer arm structure further comprises a fourth electrode. Furthermore, the MZM structure is further configured to convert the optical input signal into the optical output signal through application of the output digital data signal to the third electrode of the first waveguide interferometer arm structure and the fourth electrode of the second waveguide interferometer arm structure.

In one or more embodiments, the third electrode and the fourth electrode are configured to maintain a degree of power between the optical input signal and the optical output signal.

In one or more embodiments, a size of the first electrode is different than a size of the third electrode. In one or more embodiments, a size of the second electrode is different than a size of the fourth electrode.

In one or more embodiments, the look-up table is configured to provide the output digital data signal based on selection of the digital data signal, the redundant digital data signal, or another digital data signal.

In one or more embodiments, the optical input signal is provided to the first waveguide interferometer arm structure and the redundant optical input signal is provided to the second waveguide interferometer arm.

In one or more embodiments, the optical output signal is an optical PAM signal. In one or more embodiments, the optical output signal is an optical NRZ signal.

In yet another embodiment, a system comprises an MZM structure. The MZM structure comprises a first waveguide interferometer arm structure and a second waveguide interferometer arm structure. The first waveguide interferometer arm structure comprises a first segmented electrode associated with at least a first electrode, a second electrode, and a third electrode. The second waveguide interferometer arm structure comprises a second segmented electrode associated with at least a fourth electrode, a fifth electrode, and a sixth electrode. Furthermore, the MZM structure is configured to convert an optical input signal into an optical output signal through application of a first digital data signal to the first electrode of the first waveguide interferometer arm structure and the fourth electrode of the second waveguide interferometer arm structure, application of a second digital data signal to the second electrode of the first waveguide interferometer arm structure and the fifth electrode of the second waveguide interferometer arm structure, and application of a redundant digital data signal to the third electrode of the first waveguide interferometer arm structure and the sixth electrode of the second waveguide interferometer arm structure.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
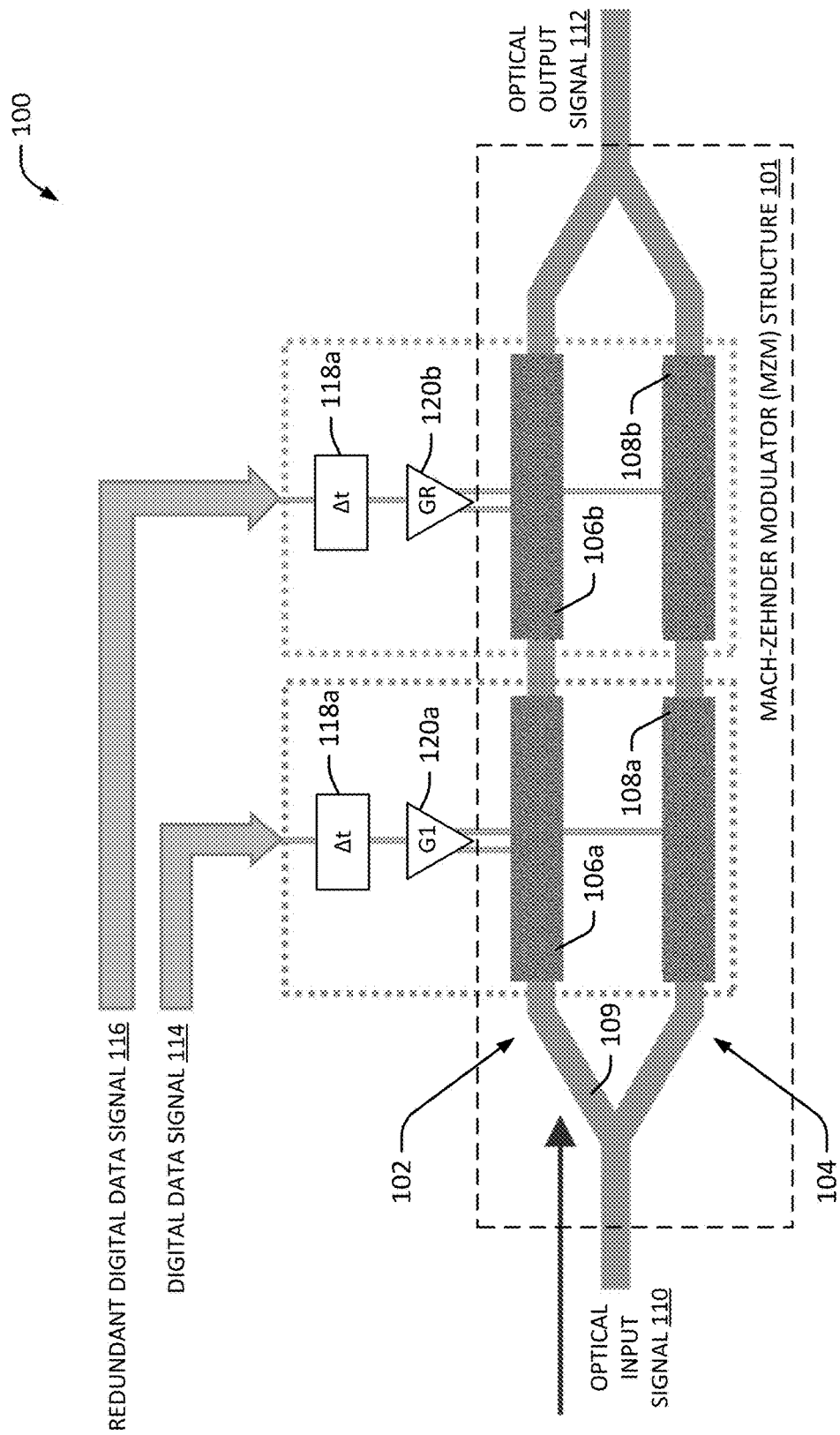
Figure 2:
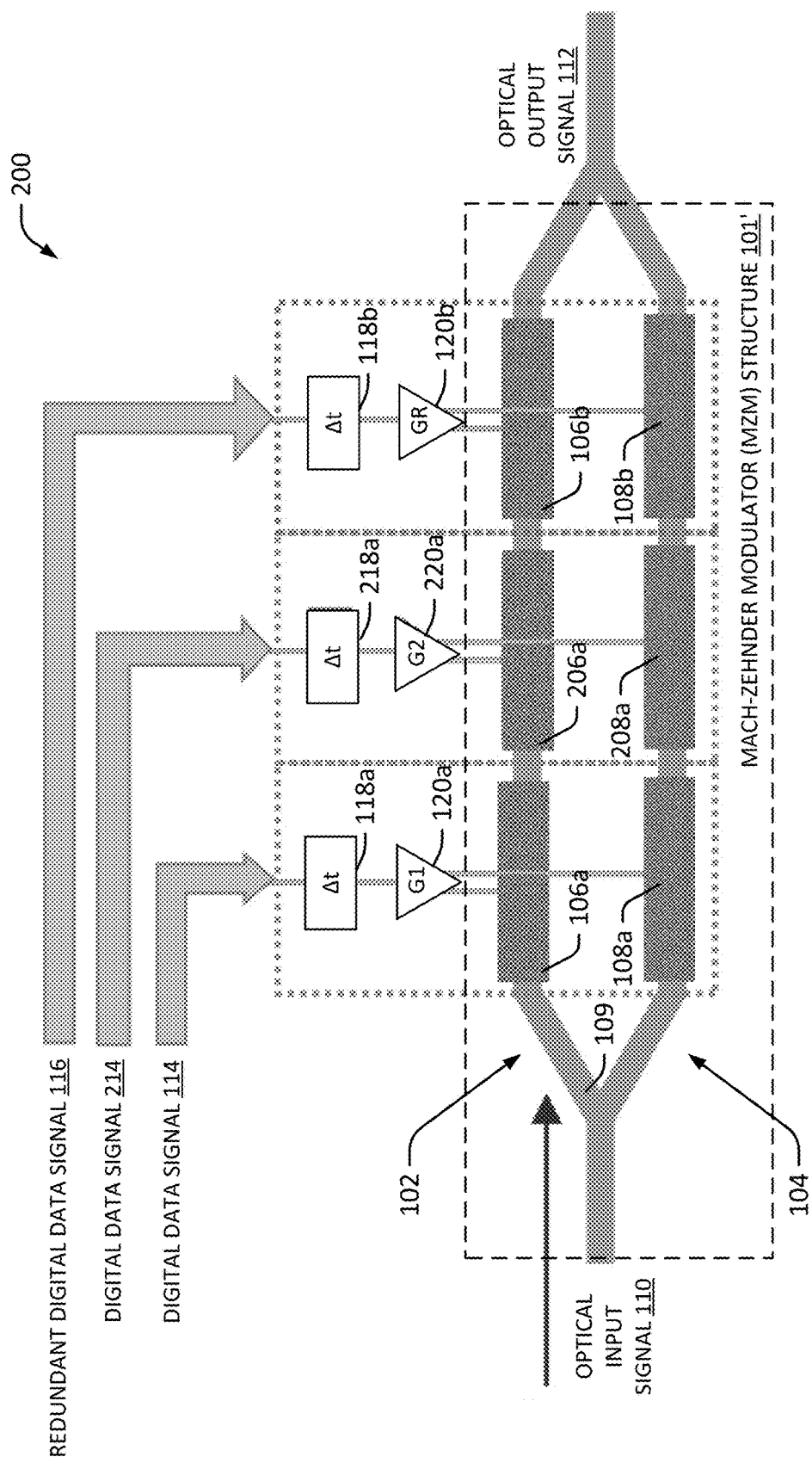
Figure 3:
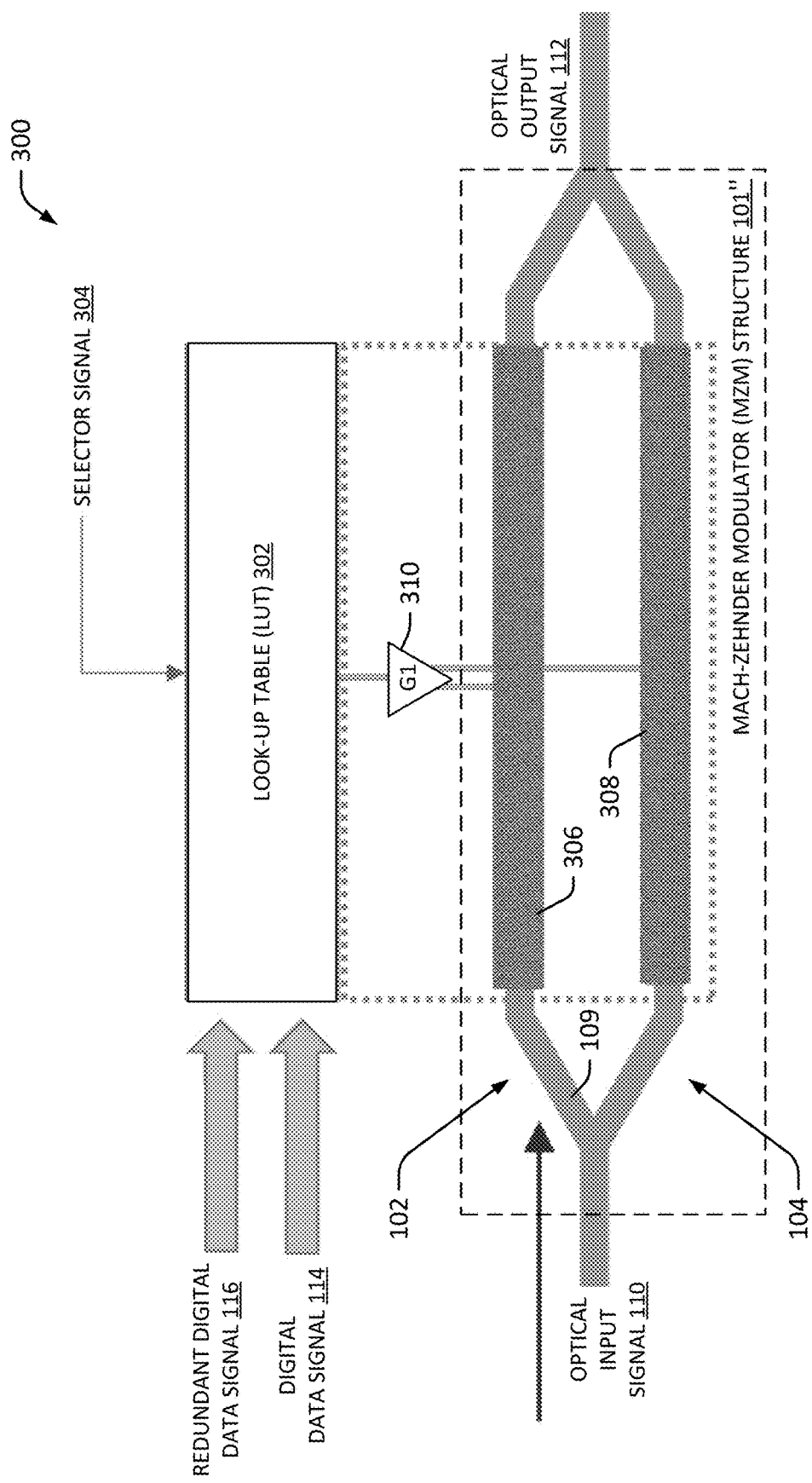
Figure 4:
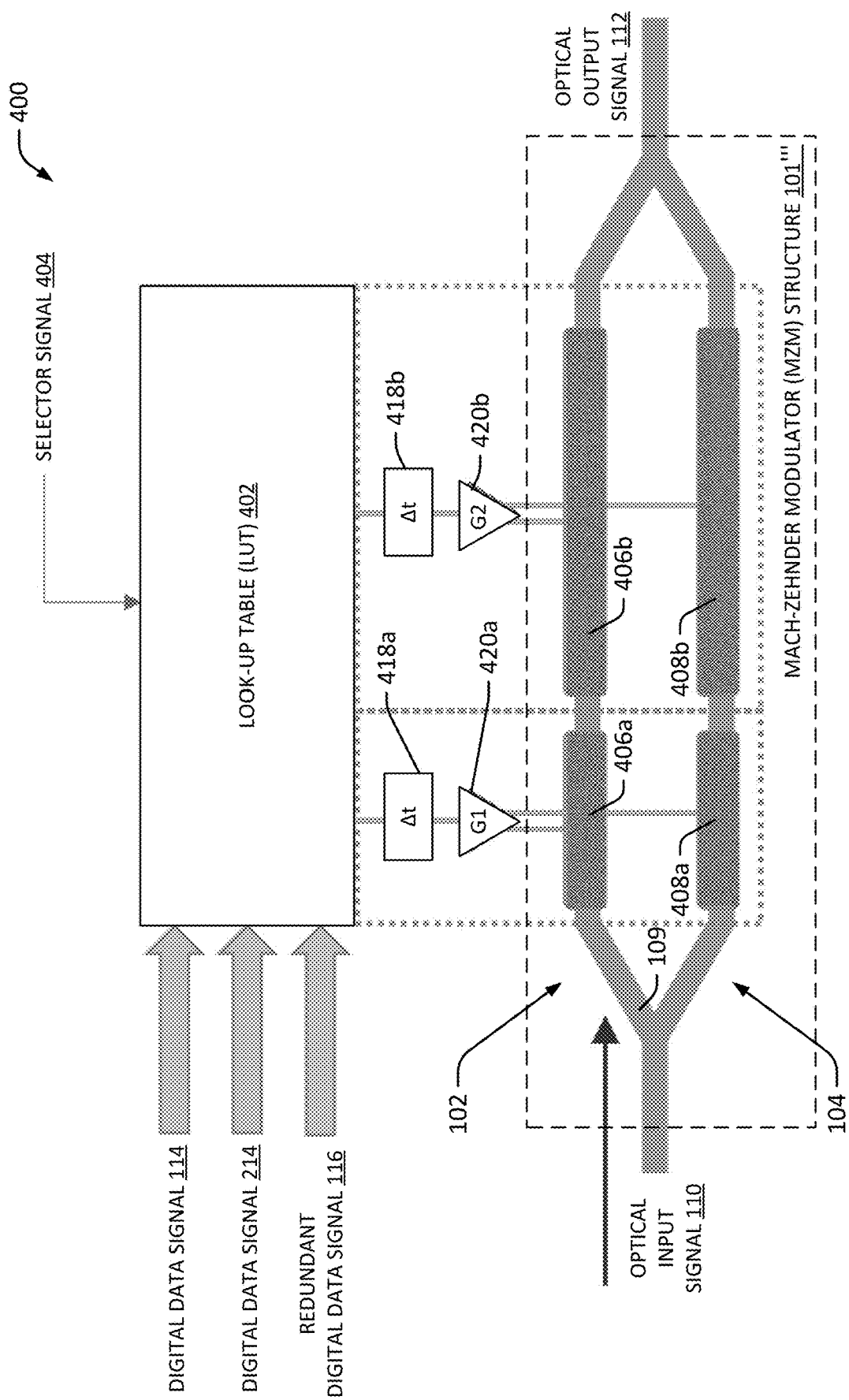
Figure 5:
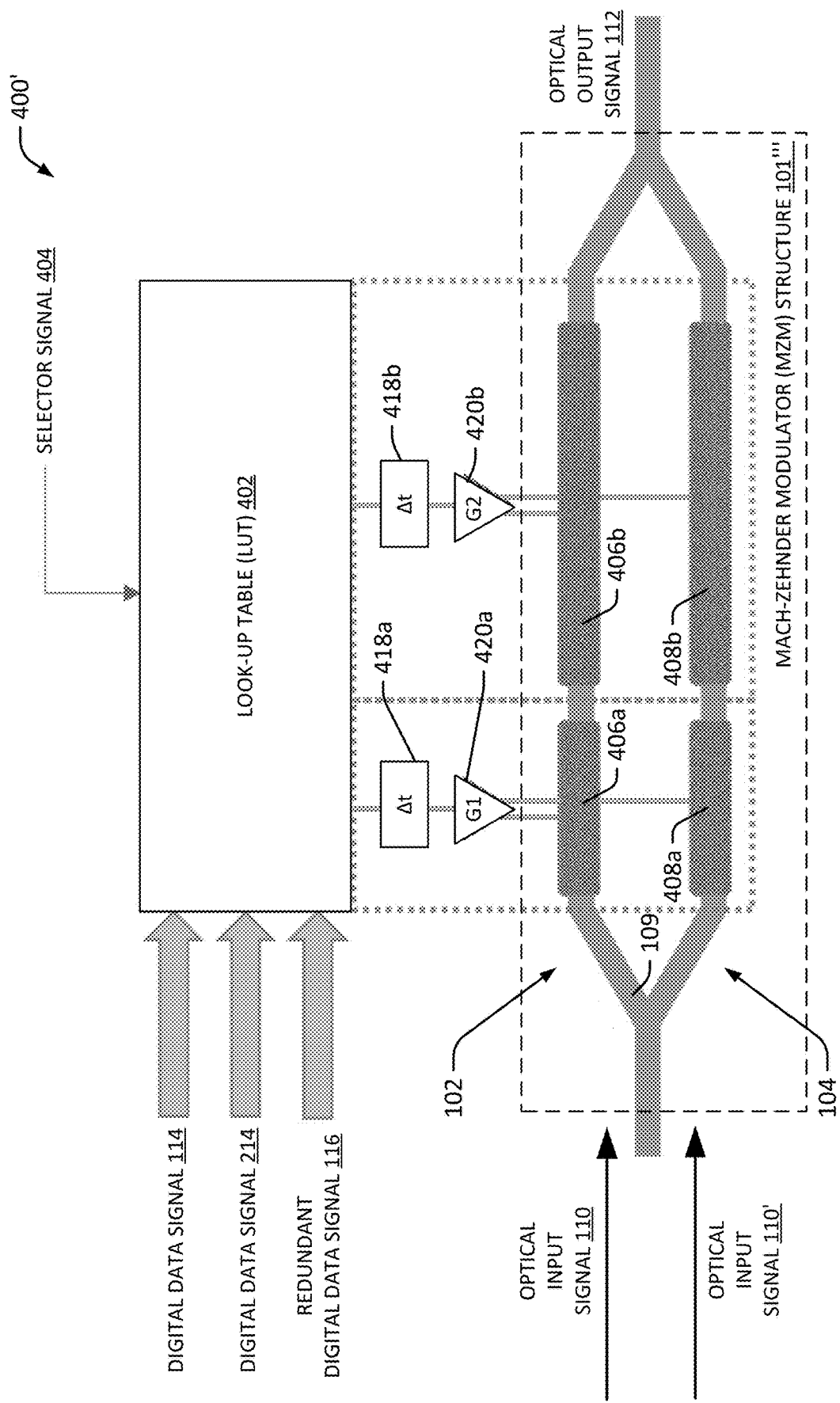
Figure 6:
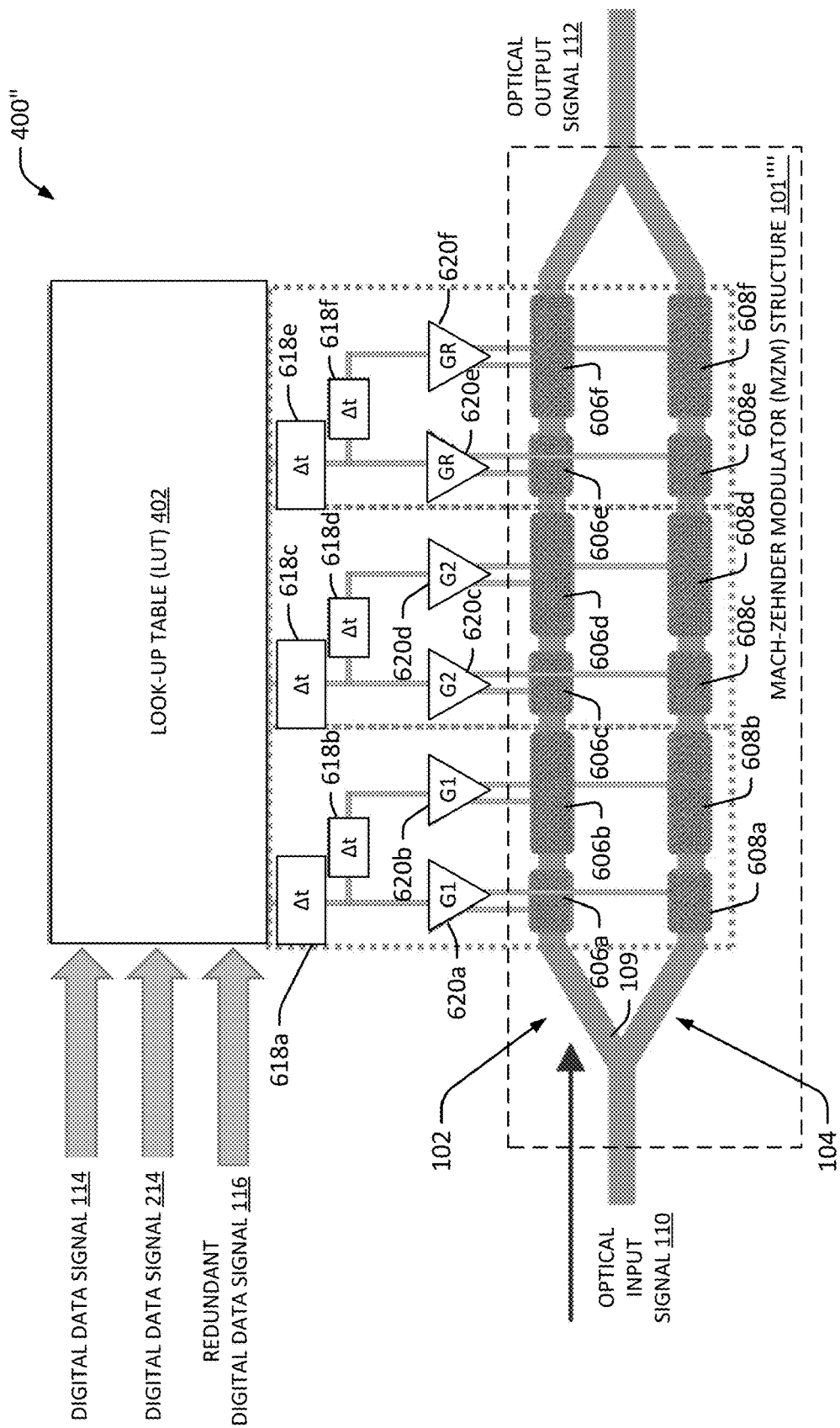
Figure 7:
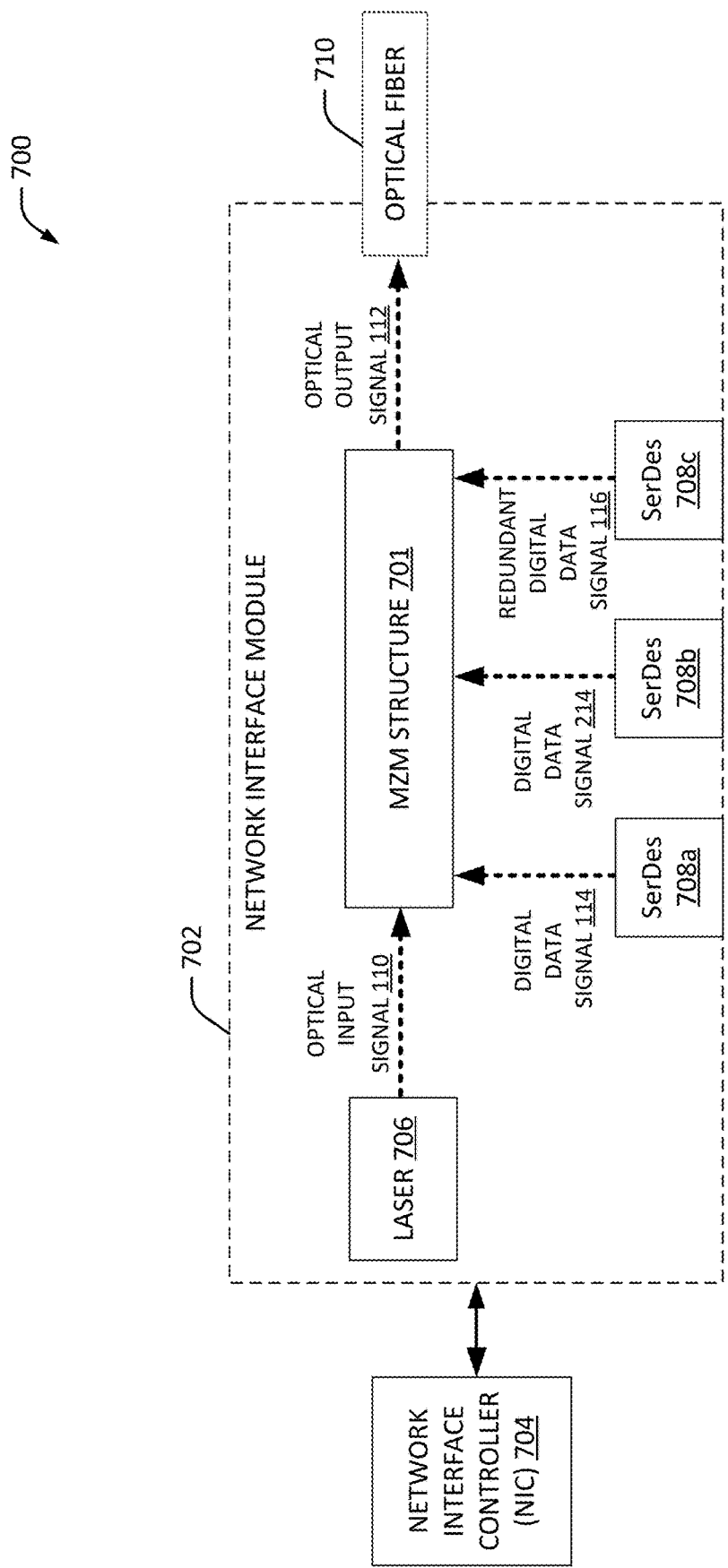
Figure 8:
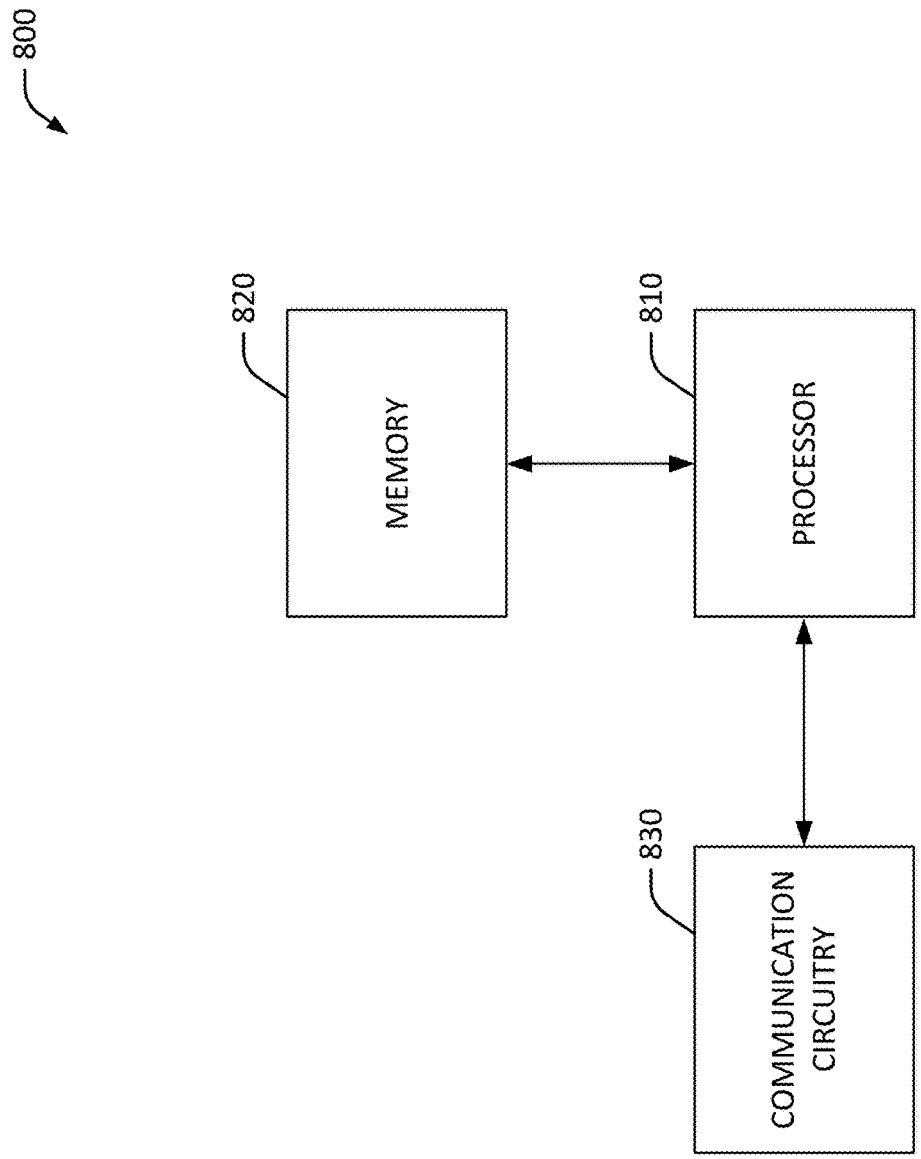

Having thus described the invention in general terms, reference will now be made to the accompanying drawings, which are not necessarily drawn to scale, and wherein:

FIG. 1 illustrates an example optical communication system, in accordance with one or more embodiments of the present disclosure;

FIG. 2 illustrates another example optical communication system, in accordance with one or more embodiments of the present disclosure;

FIG. 3 illustrates another example optical communication system, in accordance with one or more embodiments of the present disclosure;

FIG. 4 illustrates another example optical communication system, in accordance with one or more embodiments of the present disclosure;

FIG. 5 illustrates another example optical communication system, in accordance with one or more embodiments of the present disclosure;

FIG. 6 illustrates yet another example optical communication system, in accordance with one or more embodiments of the present disclosure;

FIG. 7 illustrates an example system that includes a network interface module and a network interface controller, in accordance with one or more embodiments of the present disclosure; and FIG. 8 illustrates an example computing system that may be embedded in the communication system, in accordance with one or more embodiments of the present disclosure.

DETAILED DESCRIPTION OF THE INVENTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

Optical communications have fundamentally enabled many advances in networks over the last decades. For example, because information no longer needs to be processed at the place where it has been harvested or generated, information can be transported to dedicated spaces for computation. As a result, cloud computing is enabled and has changed the landscape of the Internet. The transfer of information between data centers or high-performance computing clusters (HPC), or intra-data center or intra-HPC, usually makes use of optical communication systems that require laser sources for generating the light channels. The light conveying the information can be generated through external modulators (e.g., Mach-Zehnder modulators, micro-ring modulators, or externally modulated lasers (EMLs)) or directly by the same device that generates the light (e.g. directly modulated lasers (DMLs), or vertical cavity surface emitting lasers (VCSELs)).

In intra-data center communications, distances are traditionally short (<10 km). Such links pose a unique set of requirements combining low-cost processing per data bit and very high data capacity. In order to cope with bandwidth demand in datacenters, it is generally desirable to double the speed and cut down the cost of such links every few years. In this regard, high-speed photonic component technologies are generally employed for intra-data center communications. For example, single-mode technologies such as an indium-phosphide electro-absorption modulated laser (EML) and/or a silicon photonic Mach-Zehnder modulator can be employed for intra-data center communications. As bandwidth demand in datacenters persists, it is desirable to continue to also scale one or more of these technologies. As such, in certain implementations in order to satisfy bandwidth demand in datacenters, it is desirable to improve modulation components such as Mach-Zehnder modulators which typically offer larger bandwidth values compared to EMLs.

Thus, to address these and/or other issues, serial data conversion redundancy using optical modulators is disclosed herein. In one or more embodiments, a serializer and/or a deserializer with redundancy using optical modulators is provided. In one or more embodiments, a Mach-Zehnder modulator generates a non-return-to-zero (NRZ) optical signal using passive optical redundancy. Alternatively, in one or more embodiments, a Mach-Zehnder modulator generates a Pulse Amplitude Modulation (PAM) optical signal using passive optical redundancy. In one or more embodiments, a Mach-Zehnder modulator employs a look-up table (LUT) to generate an NRZ optical signal and/or a PAM optical signal using passive optical redundancy. Additionally or alternatively, in one or more embodiments, a Mach-Zehnder modulator employs a redundant continuous wave signal to facilitate generation of an NRZ optical signal and/or a PAM optical signal using passive optical redundancy.

By employing a Mach-Zehnder modulator as disclosed herein to provide passive optical redundancy, downtime of optical interconnect links for intra-data center communications can be reduced. As such, performance of a network device (e.g., a serializer/deserializer) can be improved. For example, by employing a Mach-Zehnder modulator as disclosed herein, one or more potential failures with respect to a network device can be mitigated. Additionally or alternatively, by employing a Mach-Zehnder modulator as disclosed herein to provide passive optical redundancy, performance of an optical transceiver can be improved. For example, improved resilience of an optical transceiver can be provided by employing redundant optical modulators and/or redundant laser sources. In one or more embodiments, a Mach-Zehnder modulator disclosed herein provides bandwidth efficient modulation that can scale the bitrate of transmitted data without having to increase the bandwidth of photonic components. In various embodiments, a Mach-Zehnder modulator disclosed herein provides modulation with increased bitrate as compared to conventional short-reach optical communications. In various embodiments, by employing a Mach-Zehnder modulator disclosed herein, a transmitter with improved bandwidth is provided. As such, improved bandwidth in short-reach optical links can be provided. For instance, scaling to higher transmitted bitrates can be provided without the need for a faster modulator and/or faster driving electronics in a transmitter.

FIG. 1 illustrates a system 100 that facilitates optical communications according to one or more embodiments of the present disclosure. In one or more embodiments, the system 100 is configured to provide passive optical redundancy to facilitate optical communications. The system 100 includes a Mach-Zehnder modulator (MZM) structure 101. In one or more embodiments, the MZM structure 101 can be a silicon photonic MZM. In one or more embodiments, the MZM structure 101 can be configured as a modulator to convert one or more data streams from an electrical domain to an optical domain. For example, in one or more embodiments, the MZM structure 101 can be configured as a modulator to convert one or more electrical lanes into one or more optical lanes. The MZM structure 101 includes a waveguide interferometer arm structure 102 and a waveguide interferometer arm structure 104. For example, the waveguide interferometer arm structure 102 can be a first waveguide interferometer arm structure of the MZM structure 101 and the waveguide interferometer arm structure 104 can be a second waveguide interferometer arm structure of the MZM structure 101. In one or more embodiments, the waveguide interferometer arm structure 102 can be a top waveguide interferometer arm structure of the MZM structure 101 that comprises an electrode 106a and/or an electrode 106b. Furthermore, the waveguide interferometer arm structure 104 can be a bottom waveguide interferometer arm structure of the MZM structure 101 that comprises an electrode 108a and/or an electrode 108b. In an aspect, the electrode 106a can be a first electrode of the MZM structure 101, the electrode 106b can be a second electrode of the MZM structure 101, the electrode 108a can be a third electrode of the MZM structure 101, and/or the electrode 108b can be a fourth electrode of the MZM structure 101. The electrode 106a, the electrode 106b, the electrode 108a, and/or the electrode 108b can apply respective electric fields to a waveguide 109 of the MZM structure 101 (e.g., a waveguide 109 of the waveguide interferometer arm structure 102 and/or the waveguide interferometer arm structure 104) to control phase modulation for an optical input signal 110. In an aspect, a first side of the electrode 106a and the electrode 108a are coupled via an input portion of the waveguide 109. Furthermore, a second side of the electrode 106a is coupled to a first side of the electrode 106b via the waveguide 109 and a second side of the electrode 108a is coupled to a first side of the electrode 108b via the waveguide 109. In addition, a second side of the electrode 106b and the electrode 108b are couped via an output portion of the waveguide 109.

In one or more embodiments, the waveguide 109 of the MZM structure 101 is configured to receive the optical input signal 110. The optical input signal 110 can be, for example, an optical signal generated by a laser. The optical input signal 110 can be an unmodulated optical carrier. The waveguide 109 can be an optical waveguide. For example, the waveguide 109 can include a core and/or a cladding. Light associated with the optical input signal 110 can be transmitted via the core of the waveguide 109. Furthermore, the cladding of the waveguide 109 can be a surrounding medium for the core that is not associated with transmission of light associated with the optical input signal 110. The core of the waveguide 109 can comprise a higher index of refraction than the cladding, such that, in operation, light is directed by the cladding back toward the core, and light is thereby propagated through the waveguide 109. In an embodiment, the core of the waveguide 109 can comprise silicon. Additionally, the cladding of the waveguide 109 can include silicon dioxide or silicon nitride. However, it is to be appreciated that, in certain embodiments, the core and/or the cladding of the waveguide 109 can comprise a different type of material such that the core comprises a higher index of refraction than the cladding. In one or more embodiments, the waveguide 109 can be patterned into a silicon layer of the MZM structure 101. In certain embodiments, the input portion of the waveguide 109 comprises an optical splitter configured to split the optical input signal 110 into a first portion of the optical input signal 110 provided to the waveguide interferometer arm structure 102 and a second portion of the optical input signal 110 provided to the waveguide interferometer arm structure 104. For example, in certain embodiments, the input portion of the waveguide 109 comprises an optical splitter configured to split the optical input signal 110 into a first portion of the optical input signal 110 provided to the electrode 106a and a second portion of the optical input signal 110 provided to the electrode 108b.

In one or more embodiments, the electrode 106a and/or the electrode 106b can be configured as a top arm phase shifter of the MZM structure 101. Furthermore, the electrode 108a and/or the electrode 108b can be configured as a bottom arm phase shifter of the MZM structure 101. In one or more embodiments, the electrode 106a can comprise first semiconductor material associated with a first doped region of the MZM structure 101, the electrode 106b can comprise second semiconductor material associated with a second doped region of the MZM structure 101, the electrode 108a can comprise third semiconductor material associated with a third doped region of the MZM structure 101, and the electrode 108b can comprise fourth semiconductor material associated with a fourth doped region of the MZM structure 101. For example, in one or more embodiments, the first semiconductor material of the electrode 106a, the second semiconductor material of the electrode 106b, the third semiconductor material of the electrode 108a, and/or the fourth semiconductor material of the electrode 108b can comprise silicon (e.g., doped silicon), silicon dioxide, silicide and/or a metal. In certain embodiments, the electrode 106a and the electrode 106b can form a first segmented electrode of the MZM structure 101 and the electrode 108a and the electrode 108b can form a second segmented electrode of the MZM structure 101. For example, as disclosed herein, a "segmented electrode" can refer to an electrode that is arranged as two or more electrodes separated by a certain distance.

In various embodiments, the electrode 106a, the electrode 106b, the electrode 108a, and/or the electrode 108b (e.g., the first segmented electrode and/or the second segmented electrode) can be configured to maintain one or more signal characteristics (e.g., a degree of power) between the optical input signal 110 and the optical output signal 112. In one or more embodiments, a size of the electrode 106a corresponds to a size of the electrode 106b. Additionally or alternatively, in one or more embodiments, a size of the electrode 108a corresponds to a size of the electrode 108b. Additionally or alternatively, in one or more embodiments, the electrode 106a, the electrode 106b, the electrode 108a, and the electrode 108b can be configured with the same size. Additionally or alternatively, in one or more embodiments, a shape of the electrode 106a corresponds to a shape of the electrode 106b. Additionally or alternatively, in one or more embodiments, a shape of the electrode 108a corresponds to a shape of the electrode 108b. Additionally or alternatively, in one or more embodiments, the electrode 106a, the electrode 106b, the electrode 108a, and the electrode 108b can comprise the same shape. A shape of the electrode 106a, the electrode 106b, the electrode 108a, and/or the electrode 108b can be, for example, a square, a rectangle, or another shape with a certain surface area and/or density. Additionally or alternatively, in one or more embodiments, a bias of the electrode 106a corresponds to a bias of the electrode 106b. Additionally or alternatively, in one or more embodiments, a bias of the electrode 108a corresponds to a bias of the electrode 108b. Additionally or alternatively, in one or more embodiments, the electrode 106a, the electrode 106b, the electrode 108a, and the electrode 108b can comprise the same bias. A bias of the electrode 106a, the electrode 106b, the electrode 108a, and/or the electrode 108b can be, for example, an amount of voltage applied to the electrode 106a, the electrode 106b, the electrode 108a, and/or the electrode 108b.

The MZM structure 101 can be configured to convert the optical input signal 110 into an optical output signal 112 based on a digital data signal 114 and/or a redundant digital data signal 116. In one or more embodiments, the MZM structure 101 can be configured to convert the optical input signal 110 into the optical output signal 112 through application of the digital data signal 114 to the electrode 106a of the waveguide interferometer arm structure 102 and the electrode 108a of the waveguide interferometer arm structure 104. Additionally, the MZM structure 101 can be configured to convert the optical input signal 110 into the optical output signal 112 based further on application of the redundant digital data signal 116 to the electrode 106b of the waveguide interferometer arm structure 102 and the electrode 108b of the waveguide interferometer arm structure 104. For example, the MZM structure 101 can be configured to modulate the optical input signal 110 to provide the optical output signal 112 (e.g., a modulated version of the optical input signal 110) through application of the digital data signal 114 to the electrode 106a of the waveguide interferometer arm structure 102 and the electrode 108a of the waveguide interferometer arm structure 104, and based further on application of the redundant digital data signal 116 to the electrode 106b of the waveguide interferometer arm structure 102 and the electrode 108b of the waveguide interferometer arm structure 104. In an embodiment, the optical output signal 112 provided by the MZM structure 101 can be an NRZ optical signal. For example, in an embodiment, the optical output signal 112 provided by the MZM structure 101 can be encoded using a pulse-amplitude modulation where a digital one value is represented by a first condition (e.g., a positive voltage) of the optical output signal 112 and a digital zero value is represented by a second condition (e.g., a negative voltage) of the optical output signal 112. In certain embodiments, the output portion of the waveguide 109 comprises an optical combiner configured to combine a first optical signal provided by the waveguide interferometer arm structure 102 and a second optical signal provided by the waveguide interferometer arm structure 104 into the output optical signal 112.

The digital data signal 114 may be, for example, an electrical signal associated with a set of bits. In one or more embodiments, the digital data signal 114 is configured with one or more amplitude levels associated with respective voltage levels. Additionally, in one or more embodiments, the digital data signal 114 can be an electrical driving signal for the MZM structure 101. For example, the digital data signal 114 can be configured to bias the MZM structure 101 to facilitate conversion of the optical input signal 110 into the optical output signal 112. In one or more embodiments, the digital data signal 114 can be configured to bias the MZM structure 101 at an operating point of the MZM structure 101. In certain embodiments, the digital data signal 114 can be a polybinary electrical signal. For example, in certain embodiments, the digital data signal 114 can be a multi-level partial response signal provided to the MZM structure 101 where the digital data signal 114 is generated by adding duobinary most significant bits and least significant bits. In certain embodiments, the digital data signal 114 can be provided to the MZM structure 101 via separate most significant bit and least significant bit duobinary tributaries. For example, in certain embodiments, respective most significant bit and least significant bit duobinary tributaries of the digital data signal 114 can be applied to the electrode 106a and/or the electrode 108a of the MZM structure 101. In one or more embodiments, the digital data signal 114 is provided by a serializer/deserializer (SerDes) device (e.g., a SerDes circuit).

The redundant digital data signal 116 can be, for example, a redundant version of the digital data signal 114. For example, redundant digital data signal 116 can be provided by a redundant SerDes device (e.g., a redundant SerDes circuit) with respect to the SerDes device that provides the digital data signal 114. The redundant digital data signal 116 may be, for example, an electrical signal associated with a set of bits. In one or more embodiments, the redundant digital data signal 116 is configured with one or more amplitude levels associated with respective voltage levels. Additionally, in one or more embodiments, the redundant digital data signal 116 can be an electrical driving signal for the MZM structure 101. For example, the redundant digital data signal 116 can be configured to bias the MZM structure 101 to facilitate conversion of the optical input signal 110 into the optical output signal 112. In one or more embodiments, the redundant digital data signal 116 can be configured to bias the MZM structure 101 at an operating point of the MZM structure 101. In certain embodiments, the redundant digital data signal 116 can be a polybinary electrical signal. For example, in certain embodiments, the redundant digital data signal 116 can be a multi-level partial response signal provided to the MZM structure 101 where the redundant digital data signal 116 is generated by adding duobinary most significant bits and least significant bits. In certain embodiments, the redundant digital data signal 116 can be provided to the MZM structure 101 via separate most significant bit and least significant bit duobinary tributaries. For example, in certain embodiments, respective most significant bit and least significant bit duobinary tributaries of the redundant digital data signal 116 can be applied to the electrode 106b and/or the electrode 108b of the MZM structure 101. In certain embodiments, a certain amount of delay 118a can be added to the digital data signal 114 and/or certain amount of delay 118b can be added to the redundant digital data signal 116. For example, in certain embodiments, the delay 118a and/or the delay 118b can be employed to control delay between the digital data signal 114 and the redundant digital data signal 116 provided to the MZM structure 101. Additionally, in certain embodiments, a driver 120a can be employed to provide the digital data signal 114 to the electrode 106a and/or the electrode 108a of the MZM structure 101. Furthermore, in certain embodiments, a driver 120b can be employed to provide the redundant digital data signal 116 to the electrode 106b and/or the electrode 108b of the MZM structure 101.

In an embodiment, the redundant digital data signal 116 can be provided to the electrode 106b and/or the electrode 108b of the MZM structure 101 in response to a determination that the digital data signal 114 is associated with a failure condition. For example, the redundant digital data signal 116 can be provided to the electrode 106b and/or the electrode 108b of the MZM structure 101 in response to a loss of signal indicator for the digital data signal 114 being generated to indicate that the digital data signal 114 and/or a connection for the digital data signal 114 is terminated. In another example, the redundant digital data signal 116 can be provided to the electrode 106b and/or the electrode 108b of the MZM structure 101 in response to a certain degree of performance degradation for the digital data signal 114 being satisfied. In another embodiment, the redundant digital data signal 116 can be provided to the electrode 106b and/or the electrode 108b of the MZM structure 101 in response to a determination that the electrode 106a and/or the electrode 108a of the MZM structure 101 is associated with a failure condition. For example, the redundant digital data signal 116 can be provided to the electrode 106b and/or the electrode 108b of the MZM structure 101 in response to a certain degree of performance degradation (e.g., electrical radio frequency performance degradation) for the electrode 106b and/or the electrode 108b being satisfied. In one or more embodiments, the digital data signal 114 can be deactivated (e.g., transmission of the digital data signal 114 to the electrode 106a and/or the electrode 108a is withheld) in response to the redundant digital data signal 116 being activated (e.g., in response to the redundant digital data signal 116 being provided to the electrode 106b and/or the electrode 108b).

FIG. 2 illustrates a system 200 that facilitates optical communications according to one or more embodiments of the present disclosure. The system 200 can be an alternate embodiment of the system 100. In one or more embodiments, the system 200 is configured to provide passive optical redundancy to facilitate optical communications. The system 200 includes an MZM structure 101'. The MZM structure 101' can be an alternate embodiment of the MZM structure 101. In certain embodiments, the MZM structure 101' can provide a greater degree of optical modulation amplitude and/or a greater extinction ratio for the optical output signal 112 as compared to the MZM structure 101. In one or more embodiments, the MZM structure 101' can be a silicon photonic MZM. In one or more embodiments, the MZM structure 101' can be configured as a modulator to convert one or more data streams from an electrical domain to an optical domain. For example, in one or more embodiments, the MZM structure 101' can be configured as a modulator to convert one or more electrical lanes into one or more optical lanes. The MZM structure 101' includes the waveguide interferometer arm structure 102 and the waveguide interferometer arm structure 104. In an embodiment, the waveguide interferometer arm structure 102 can be a top waveguide interferometer arm structure of the MZM structure 101' that comprises the electrode 106a, an electrode 206a, and/or the electrode 106b. Furthermore, the waveguide interferometer arm structure 104 can be a bottom waveguide interferometer arm structure of the MZM structure 101' that comprises the electrode 108a, an electrode 206a, and/or the electrode 108b. The electrode 106a, the electrode 106b, the electrode 108a, the electrode 108b, the electrode 206a, and/or the electrode 206b can apply respective electric fields to the waveguide 109 of the MZM structure 101' to control phase modulation for the optical input signal 110. In an aspect, a first side of the electrode 106a and the electrode 108a are coupled via an input portion of the waveguide 109. Furthermore, a second side of the electrode 106a is coupled to a first side of the electrode 206a via the waveguide 109 and a second side of the electrode 108a is coupled to a first side of the electrode 208a via the waveguide 109. Furthermore, a second side of the electrode 206a is coupled to a first side of the electrode 106b via the waveguide 109 and a second side of the electrode 208a is coupled to a first side of the electrode 108b via the waveguide 109. In addition, a second side of the electrode 106b and the electrode 108b are couped via an output portion of the waveguide 109.

In one or more embodiments, the waveguide 109 of the MZM structure 101' is configured to receive the optical input signal 110. In one or more embodiments, the electrode 106a, the electrode 206a, and/or the electrode 106b can be configured as a top arm phase shifter of the MZM structure 101'. Furthermore, the electrode 108a, the electrode 208a, and/or the electrode 108b can be configured as a bottom arm phase shifter of the MZM structure 101'. In one or more embodiments, the electrode 106a can comprise first semiconductor material associated with a first doped region of the MZM structure 101', the electrode 206a can comprise second semiconductor material associated with a second doped region of the MZM structure 101', the electrode 106b can comprise third semiconductor material associated with a third doped region of the MZM structure 101', the electrode 108a can comprise fourth semiconductor material associated with a fourth doped region of the MZM structure 101', the electrode 208a can comprise fifth semiconductor material associated with a fifth doped region of the MZM structure 101', and the electrode 108b can comprise sixth semiconductor material associated with a sixth doped region of the MZM structure 101'. For example, in one or more embodiments, the first semiconductor material of the electrode 106a, the second semiconductor material of the electrode 206a, the third semiconductor material of the electrode 106b, the fourth semiconductor material of the electrode 108a, the fifth semiconductor material of the electrode 208a, and/or the sixth semiconductor material of the electrode 108b can comprise silicon (e.g., doped silicon), silicon dioxide, silicide and/or a metal. In certain embodiments, the electrode 106a, the electrode 206a, and the electrode 106b can form a first segmented electrode of the MZM structure 101' and the electrode 108a, the electrode 208b, and the electrode 108b can form a second segmented electrode of the MZM structure 101'.

In various embodiments, the electrode 106a, the electrode 206a, the electrode 106b, the electrode 108a, the electrode 208a, and/or the electrode 108b (e.g., the first segmented electrode and/or the second segmented electrode) can be configured to maintain a degree of power between the optical input signal 110 and the optical output signal 112. In one or more embodiments, a size of the electrode 106a corresponds to a size of the electrode 206a and/or a size of the electrode 106b. Additionally or alternatively, in one or more embodiments, a size of the electrode 108a corresponds to a size of the electrode 208a and/or a size of the electrode 108b. Additionally or alternatively, in one or more embodiments, the electrode 106a, the electrode 106b, the electrode 206a, the electrode 108a, the electrode 108b, and the electrode 208a can be configured with the same size. Additionally or alternatively, in one or more embodiments, a shape of the electrode 106a corresponds to a shape of the electrode 206a and/or a shape of the electrode 106b. Additionally or alternatively, in one or more embodiments, a shape of the electrode 108a corresponds to a size of the electrode 208a and/or a shape of the electrode 108b. Additionally or alternatively, in one or more embodiments, the electrode 106a, the electrode 106b, the electrode 206a, the electrode 108a, the electrode 108b, and the electrode 208a can comprise the same shape. Additionally or alternatively, in one or more embodiments, a bias of the electrode 106a corresponds to a bias of the electrode 206a and/or a bias of the electrode 106b. Additionally or alternatively, in one or more embodiments, a bias of the electrode 108a corresponds to a bias of the electrode 208a and/or a bias of the electrode 108b. Additionally or alternatively, in one or more embodiments, the electrode 106a, the electrode 106b, the bias 206a, the electrode 108a, the electrode 108b, and the electrode 208a can comprise the same bias.

The MZM structure 101' can be configured to convert the optical input signal 110 into an optical output signal 112 based on the digital data signal 114, a digital data signal 214, and/or the redundant digital data signal 116. In one or more embodiments, the MZM structure 101' can be configured to convert the optical input signal 110 into the optical output signal 112 through application of the digital data signal 114 to the electrode 106a of the waveguide interferometer arm structure 102 and the electrode 108a of the waveguide interferometer arm structure 104. Additionally or alternatively, the MZM structure 101' can be configured to convert the optical input signal 110 into the optical output signal 112 based further on application of the digital data signal 214 to the electrode 206a of the waveguide interferometer arm structure 102 and the electrode 208a of the waveguide interferometer arm structure 104. Additionally or alternatively, the MZM structure 101' can be configured to convert the optical input signal 110 into the optical output signal 112 based further on application of the redundant digital data signal 116 to the electrode 106b of the waveguide interferometer arm structure 102 and the electrode 108b of the waveguide interferometer arm structure 104. In an embodiment, the optical output signal 112 provided by the MZM structure 101' can be a PAM signal such as, for example, a PAM-4 signal or another PAM-X signal where X is an integer. For instance, in an embodiment, the optical output signal 112 provided by the MZM structure 101' can be an optical PAM signal that encodes information via pulse amplitude modulation associated with one or more levels. In an example, the optical output signal 112 provided by the MZM structure 101' can be a PAM-4 signal that encodes information via pulse amplitude modulation associated with four levels. In this regard, in an example, the optical output signal 112 provided by the MZM structure 101' can be an optical pulse amplitude modulation signal that encodes information in the form of amplitude levels that represent 0, 1, 2, and 3.

The digital data signal 114 is, for example, an electrical signal associated with a set of bits. In one or more embodiments, the digital data signal 114 is configured with one or more amplitude levels associated with respective voltage levels. Additionally, in one or more embodiments, the digital data signal 114 can be an electrical driving signal for the MZM structure 101'. For example, the digital data signal 114 can be configured to bias the MZM structure 101' to facilitate conversion of the optical input signal 110 into the optical output signal 112. In one or more embodiments, the digital data signal 114 can be configured to bias the MZM structure 101' at an operating point of the MZM structure 101'. In certain embodiments, the digital data signal 114 can be a polybinary electrical signal. For example, in certain embodiments, the digital data signal 114 can be a multi-level partial response signal provided to the MZM structure 101' where the digital data signal 114 is generated by adding duobinary most significant bits and least significant bits. In certain embodiments, the digital data signal 114 can be provided to the MZM structure 101' via separate most significant bit and least significant bit duobinary tributaries. For example, in certain embodiments, respective most significant bit and least significant bit duobinary tributaries of the digital data signal 114 can be applied to the electrode 106a and/or the electrode 108a of the MZM structure 101'. In one or more embodiments, the digital data signal 114 is provided by a first SerDes device (e.g., a first SerDes circuit).

The digital data signal 214 may be, for example, an electrical signal associated with a set of bits. In one or more embodiments, the digital data signal 214 is configured with one or more amplitude levels associated with respective voltage levels. Additionally, in one or more embodiments, the digital data signal 214 can be an electrical driving signal for the MZM structure 101'. For example, the digital data signal 214 can be configured to bias the MZM structure 101' to facilitate conversion of the optical input signal 110 into the optical output signal 112. In one or more embodiments, the digital data signal 214 can be configured to bias the MZM structure 101' at an operating point of the MZM structure 101'. In certain embodiments, the digital data signal 214 can be a polybinary electrical signal. For example, in certain embodiments, the digital data signal 214 can be a multi-level partial response signal provided to the MZM structure 101' where the digital data signal 214 is generated by adding duobinary most significant bits and least significant bits. In certain embodiments, the digital data signal 214 can be provided to the MZM structure 101' via separate most significant bit and least significant bit duobinary tributaries. For example, in certain embodiments, respective most significant bit and least significant bit duobinary tributaries of the digital data signal 214 can be applied to the electrode 206a and/or the electrode 208a of the MZM structure 101'. In one or more embodiments, the digital data signal 214 is provided by a second SerDes device (e.g., a second SerDes circuit). For example, the digital data signal 214 can be a different digital data signal than the digital data signal 114.

The redundant digital data signal 116 can be, for example, a redundant version of the digital data signal 114 and/or the digital data signal 214. For example, redundant digital data signal 116 can be provided by a redundant SerDes device (e.g., a redundant SerDes circuit) with respect to the first SerDes device that provides the digital data signal 114 and/or the second SerDes device that provides the digital data signal 214. The redundant digital data signal 116 may be, for example, an electrical signal associated with a set of bits. In one or more embodiments, the redundant digital data signal 116 is configured with one or more amplitude levels associated with respective voltage levels. Additionally, in one or more embodiments, the redundant digital data signal 116 can be an electrical driving signal for the MZM structure 101'. For example, the redundant digital data signal 116 can be configured to bias the MZM structure 101' to facilitate conversion of the optical input signal 110 into the optical output signal 112. In one or more embodiments, the redundant digital data signal 116 can be configured to bias the MZM structure 101 at an operating point of the MZM structure 101'. In certain embodiments, the redundant digital data signal 116 can be a polybinary electrical signal. For example, in certain embodiments, the redundant digital data signal 116 can be a multi-level partial response signal provided to the MZM structure 101' where the redundant digital data signal 116 is generated by adding duobinary most significant bits and least significant bits. In certain embodiments, the redundant digital data signal 116 can be provided to the MZM structure 101' via separate most significant bit and least significant bit duobinary tributaries. For example, in certain embodiments, respective most significant bit and least significant bit duobinary tributaries of the redundant digital data signal 116 can be applied to the electrode 106b and/or the electrode 108b of the MZM structure 101'.

In certain embodiments, a certain amount of delay 118a can be added to the digital data signal 114, a certain amount of delay 218a can be added to the digital data signal 214, and/or certain amount of delay 118b can be added to the redundant digital data signal 116. For example, in certain embodiments, the delay 118a, the delay 218a, and/or the delay 118b can be employed to control delay between the digital data signal 114, the digital data signal 214, and/or the redundant digital data signal 116 provided to the MZM structure 101'. Additionally, in certain embodiments, a driver 120a can be employed to provide the digital data signal 114 to the electrode 106a and/or the electrode 108a of the MZM structure 101'. Furthermore, in certain embodiments, a driver 220a can be employed to provide the digital data signal 214 to the electrode 206a and/or the electrode 208a of the MZM structure 101'. Furthermore, in certain embodiments, a driver 120b can be employed to provide the redundant digital data signal 116 to the electrode 106b and/or the electrode 108b of the MZM structure 101'.

FIG. 3 illustrates a system 300 that facilitates optical communications according to one or more embodiments of the present disclosure. The system 300 can be an alternate embodiment of the system 100. In one or more embodiments, the system 300 is configured to provide passive optical redundancy to facilitate optical communications. The system 300 includes an MZM structure 101". The MZM structure 101" can be an alternate embodiment of the MZM structure 101. In certain embodiments, the MZM structure 101" can provide a greater degree of optical modulation amplitude and/or a greater extinction ratio for the optical output signal 112 as compared to the MZM structure 101. In one or more embodiments, the MZM structure 101" can be a silicon photonic MZM. In one or more embodiments, the MZM structure 101" can be configured as a modulator to convert one or more data streams from an electrical domain to an optical domain. For example, in one or more embodiments, the MZM structure 101" can be configured as a modulator to convert one or more electrical lanes into one or more optical lanes. The MZM structure 101" includes the waveguide interferometer arm structure 102 and the waveguide interferometer arm structure 104. In an embodiment, the waveguide interferometer arm structure 102 can be a top waveguide interferometer arm structure of the MZM structure 101" that comprises an electrode 306. Furthermore, the waveguide interferometer arm structure 104 can be a bottom waveguide interferometer arm structure of the MZM structure 101" that comprises an electrode 308. The electrode 306 and/or the electrode 308 can apply respective electric fields to the waveguide 109 of the MZM structure 101" to control phase modulation for the optical input signal 110. In an aspect, a first side of the electrode 306 and the electrode 308 are coupled via an input portion of the waveguide 109. Furthermore, a second side of the electrode 306 and the electrode 308 are couped via an output portion of the waveguide 109.

In one or more embodiments, the waveguide 109 of the MZM structure 101" is configured to receive the optical input signal 110. In one or more embodiments, the electrode 306 can be configured as a top arm phase shifter of the MZM structure 101". Furthermore, the electrode 308 can be configured as a bottom arm phase shifter of the MZM structure 101". In one or more embodiments, the electrode 306 can comprise first semiconductor material associated with a first doped region of the MZM structure 101" and the electrode 308 can comprise second semiconductor material associated with a second doped region of the MZM structure 101". For example, in one or more embodiments, the first semiconductor material of the electrode 306 and/or the second semiconductor material of the electrode 308 can comprise silicon (e.g., doped silicon), silicon dioxide, silicide and/or a metal.

In various embodiments, the electrode 306 and the electrode 308 (e.g., the first segmented electrode and/or the second segmented electrode) can be configured to maintain a degree of power between the optical input signal 110 and the optical output signal 112. In one or more embodiments, a size of the electrode 306 corresponds to a size of the electrode 308. Additionally or alternatively, in one or more embodiments, a shape of the electrode 306 corresponds to a shape of the electrode 308. Additionally or alternatively, in one or more embodiments, a bias of the electrode 306 corresponds to a bias of the electrode 308.

The MZM structure 101" can be configured to convert the optical input signal 110 into an optical output signal 112 based on the digital data signal 114 and/or the redundant digital data signal 116. In one or more embodiments, the MZM structure 101" can be configured to convert the optical input signal 110 into the optical output signal 112 through application of the digital data signal 114 and/or the redundant digital data signal 116 to the electrode 306 of the waveguide interferometer arm structure 102 and the electrode 308 of the waveguide interferometer arm structure 104. In one or more embodiments, an LUT 302 can select the digital data signal 114 or the redundant digital data signal 116 for application to the electrode 306 of the waveguide interferometer arm structure 102 and the electrode 308 of the waveguide interferometer arm structure 104. For instance, in one or more embodiments, a selector signal 304 can control selection of the digital data signal 114 or the redundant digital data signal 116 via the LUT 302. In an embodiment, the selector signal 304 can be configured to select the redundant digital data signal 116 in response to a determination that the digital data signal 114 and/or the digital data signal 214 is associated with a failure condition. For example, the selector signal 304 can be configured to select the redundant digital data signal 116 in response to a loss of signal indicator for the digital data signal 114 being generated to indicate that the digital data signal 114 and/or a connection for the digital data signal 114 is terminated. Additionally or alternatively, the selector signal 304 can be configured to select the redundant digital data signal 116 in response to a loss of signal indicator for the digital data signal 214 being generated to indicate that the digital data signal 214 and/or a connection for the digital data signal 214 is terminated. In another example, the selector signal 304 can be configured to select the redundant digital data signal 116 in response to a certain degree of performance degradation for the digital data signal 114 and/or the digital data signal 214 being satisfied. In another embodiment, the selector signal 304 can be configured to select the redundant digital data signal 116 in response to a determination that the electrode 106a, the electrode 108a, the electrode 206a, and/or the electrode 208a of the MZM structure 101' is associated with a failure condition. For example, the selector signal 304 can be configured to select the redundant digital data signal 116 in response to a certain degree of performance degradation (e.g., electrical radio frequency performance degradation) for the electrode 106a, the electrode 108a, the electrode 206a, and/or the electrode 208a being satisfied.

In one or more embodiments, the digital data signal 114 and the redundant digital data signal 116 can be provided as input to the LUT 302. For example, respective input symbols (e.g., input symbols comprised of a least significant bit and a most significant bit) for the digital data signal 114 and the redundant digital data signal 116 can be provided as input to the LUT 302. Furthermore, the LUT 302 can select respective bits from the digital data signal 114 or the redundant digital data signal 116 as output to provide to the MZM structure 101". In certain embodiments, the LUT 302 can be configured to map one or more input values (e.g., one or more input values associated with the digital data signal 114 or the redundant digital data signal 116) to an output value. In some embodiments, the LUT 302 is a hardware-based lookup table circuit. For example, in some embodiments, the LUT 302 can include one or more hardware gates, one or more hardware latches, one or more hardware relays, and/or one or more other hardware components. In an embodiment, the optical output signal 112 provided by the MZM structure 101" can be an NRZ optical signal. For example, in an embodiment, the optical output signal 112 provided by the MZM structure 101" can be encoded using a pulse-amplitude modulation where a digital one value is represented by a first condition (e.g., a positive voltage) of the optical output signal 112 and a digital zero value is represented by a second condition (e.g., a negative voltage) of the optical output signal 112.

In one or more embodiments, the digital data signal 114 can be an electrical driving signal for the MZM structure 101". For example, the digital data signal 114 can be configured to bias the MZM structure 101" to facilitate conversion of the optical input signal 110 into the optical output signal 112. In one or more embodiments, the digital data signal 114 can be configured to bias the MZM structure 101" at an operating point of the MZM structure 101". In certain embodiments, the digital data signal 114 can be a polybinary electrical signal. For example, in certain embodiments, the digital data signal 114 can be a multi-level partial response signal provided to the MZM structure 101" where the digital data signal 114 is generated by adding duobinary most significant bits and least significant bits. In certain embodiments, the digital data signal 114 can be provided to the MZM structure 101" via separate most significant bit and least significant bit duobinary tributaries. For example, in certain embodiments, respective most significant bit and least significant bit duobinary tributaries of the digital data signal 114 can be applied to the electrode 306 and/or the electrode 308 of the MZM structure 101". In one or more embodiments, the digital data signal 114 is provided by a first SerDes device (e.g., a first SerDes circuit).

Additionally, in one or more embodiments, the redundant digital data signal 116 can be an electrical driving signal for the MZM structure 101". For example, the redundant digital data signal 116 can be configured to bias the MZM structure 101" to facilitate conversion of the optical input signal 110 into the optical output signal 112. In one or more embodiments, the redundant digital data signal 116 can be configured to bias the MZM structure 101 at an operating point of the MZM structure 101". In certain embodiments, the redundant digital data signal 116 can be a polybinary electrical signal. For example, in certain embodiments, the redundant digital data signal 116 can be a multi-level partial response signal provided to the MZM structure 101" where the redundant digital data signal 116 is generated by adding duobinary most significant bits and least significant bits. In certain embodiments, the redundant digital data signal 116 can be provided to the MZM structure 101" via separate most significant bit and least significant bit duobinary tributaries. For example, in certain embodiments, respective most significant bit and least significant bit duobinary tributaries of the redundant digital data signal 116 can be applied to the electrode 306 and/or the electrode 308 of the MZM structure 101". In certain embodiments, a driver 310 can be employed to provide the digital data signal 114 and/or the redundant digital data signal 116 to the electrode 306 and/or the electrode 308 of the MZM structure 101".

FIG. 4 illustrates a system 400 that facilitates optical communications according to one or more embodiments of the present disclosure. The system 400 can be an alternate embodiment of the system 300. In one or more embodiments, the system 400 is configured to provide passive optical redundancy to facilitate optical communications. The system 400 includes an MZM structure 101'''. The MZM structure 101''' can be an alternate embodiment of the MZM structure 101. In one or more embodiments, the MZM structure 101''' can be a silicon photonic MZM. In one or more embodiments, the MZM structure 101''' can be configured as a modulator to convert one or more data streams from an electrical domain to an optical domain. For example, in one or more embodiments, the MZM structure 101''' can be configured as a modulator to convert one or more electrical lanes into one or more optical lanes. The MZM structure 101''' includes the waveguide interferometer arm structure 102 and the waveguide interferometer arm structure 104. In an embodiment, the waveguide interferometer arm structure 102 can be a top waveguide interferometer arm structure of the MZM structure 101''' that comprises an electrode 406a and/or an electrode 406b. Furthermore, the waveguide interferometer arm structure 104 can be a bottom waveguide interferometer arm structure of the MZM structure 101''' that comprises an electrode 408a and/or an electrode 408b. The electrode 406a, the electrode 406b, the electrode 408a, and/or the electrode 408b can apply respective electric fields to the waveguide 109 of the MZM structure 101''' to control phase modulation for the optical input signal 110. In an aspect, a first side of the electrode 406a and the electrode 408a are coupled via an input portion of the waveguide 109. Furthermore, a second side of the electrode 406a is coupled to a first side of the electrode 406b via the waveguide 109 and a second side of the electrode 408a is coupled to a first side of the electrode 408b via the waveguide 109. In addition, a second side of the electrode 406b and the electrode 408b are couped via an output portion of the waveguide 109.

In one or more embodiments, the waveguide 109 of the MZM structure 101''' is configured to receive the optical input signal 110. In one or more embodiments, the electrode 406a and the electrode 406b can be configured as a top arm phase shifter of the MZM structure 101'''. Furthermore, the electrode 408a and the electrode 408b can be configured as a bottom arm phase shifter of the MZM structure 101'''. In one or more embodiments, the electrode 406a can comprise first semiconductor material associated with a first doped region of the MZM structure 101''', the electrode 406b can comprise second semiconductor material associated with a second doped region of the MZM structure 101''', the electrode 408a can comprise third semiconductor material associated with a third doped region of the MZM structure 101''', and the electrode 408b can comprise fourth semiconductor material associated with a fourth doped region of the MZM structure 101'''. For example, in one or more embodiments, the first semiconductor material of the electrode 406a, the second semiconductor material of the electrode 406b, the third semiconductor material of the electrode 408a, and/or the fourth semiconductor material of the electrode 408b can comprise silicon (e.g., doped silicon), silicon dioxide, silicide and/or a metal.

In various embodiments, the electrode 406a, the electrode 406b, the electrode 408a, and/or the electrode 408b (e.g., the first segmented electrode and/or the second segmented electrode) can be configured to maintain a degree of power between the optical input signal 110 and the optical output signal 112. In one or more embodiments, a size of the electrode 406a can be different than a size of the electrode 406b. Additionally or alternatively, in one or more embodiments, a size of the electrode 408a can be different than a size of the electrode 108b. Additionally or alternatively, in one or more embodiments, the electrode 406a and the electrode 408a can be configured with the same size. Additionally or alternatively, in one or more embodiments, the electrode 406b and the electrode 408b can be configured with the same size. Additionally or alternatively, in one or more embodiments, a shape of the electrode 406a can be different than a shape of the electrode 406b. Additionally or alternatively, in one or more embodiments, a shape of the electrode 408a can be different than a shape of the electrode 408b. Additionally or alternatively, in one or more embodiments, the electrode 406a and the electrode 408a can comprise the same shape. Additionally or alternatively, in one or more embodiments, the electrode 406b and the electrode 408b can comprise the same shape. Additionally or alternatively, in one or more embodiments, a bias of the electrode 406a can be different than a bias of the electrode 406b. Additionally or alternatively, in one or more embodiments, a bias of the electrode 408a can be different than a bias of the electrode 408b. Additionally or alternatively, in one or more embodiments, the electrode 406a and the electrode 408a can comprise the same bias. Additionally or alternatively, in one or more embodiments, the electrode 406b and the electrode 408b can comprise the same bias.

The MZM structure 101''' can be configured to convert the optical input signal 110 into an optical output signal 112 based on the digital data signal 114, the digital signal 214, and/or the redundant digital data signal 116. In one or more embodiments, the MZM structure 101''' can be configured to convert the optical input signal 110 into the optical output signal 112 through application of the digital data signal 114, the digital data signal 214, and/or the redundant digital data signal 116 to the electrode 406a and the electrode 406b of the waveguide interferometer arm structure 102 and the electrode 408a and the electrode 408b of the waveguide interferometer arm structure 104. In one or more embodiments, a LUT 402 can select the digital data signal 114, the digital data signal 214, or the redundant digital data signal 116 for application to the electrode 406a and/or the electrode 406b of the waveguide interferometer arm structure 102 and the electrode 408a and/or the electrode 408b of the waveguide interferometer arm structure 104. For instance, in one or more embodiments, a selector signal 404 can control selection of the digital data signal 114, the digital data signal 214 or the redundant digital data signal 116 via the LUT 402. In one or more embodiments, the digital data signal 114, the digital data signal 214, and the redundant digital data signal 116 can be provided as input to the LUT 402. For example, respective input symbols (e.g., input symbols comprised of a least significant bit and a most significant bit) for the digital data signal 114, the digital data signal 214, and the redundant digital data signal 116 can be provided as input to the LUT 402. Furthermore, the LUT 402 can select respective bits from the digital data signal 114, the digital data signal 214 or the redundant digital data signal 116 as output to provide to the MZM structure 101'''. In certain embodiments, the LUT 402 can be configured to map one or more input values (e.g., one or more input values associated with the digital data signal 114, the digital data signal 214 or the redundant digital data signal 116) to an output value. In some embodiments, the LUT 402 is a hardware-based lookup table circuit. For example, in some embodiments, the LUT 402 can include one or more hardware gates, one or more hardware latches, one or more hardware relays, and/or one or more other hardware components. In an embodiment, the optical output signal 112 provided by the MZM structure 101''' can be a PAM signal such as, for example, a PAM-4 signal or another PAM-X signal where X is an integer. For instance, in an embodiment, the optical output signal 112 provided by the MZM structure 101''' can be an optical PAM signal that encodes information via pulse amplitude modulation associated with one or more levels. In an example, the optical output signal 112 provided by the MZM structure 101''' can be a PAM-4 signal that encodes information via pulse amplitude modulation associated with four levels. In this regard, in an example, the optical output signal 112 provided by the MZM structure 101''' can be an optical pulse amplitude modulation signal that encodes information in the form of amplitude levels that represent 0, 1, 2, and 3.

In one or more embodiments, the digital data signal 114 can be an electrical driving signal for the MZM structure 101'''. For example, the digital data signal 114 can be configured to bias the MZM structure 101''' to facilitate conversion of the optical input signal 110 into the optical output signal 112. In one or more embodiments, the digital data signal 114 can be configured to bias the MZM structure 101''' at an operating point of the MZM structure 101'''. In certain embodiments, the digital data signal 114 can be a polybinary electrical signal. For example, in certain embodiments, the digital data signal 114 can be a multi-level partial response signal provided to the MZM structure 101''' where the digital data signal 114 is generated by adding duobinary most significant bits and least significant bits. In certain embodiments, the digital data signal 114 can be provided to the MZM structure 101''' via separate most significant bit and least significant bit duobinary tributaries. For example, in certain embodiments, respective most significant bit and least significant bit duobinary tributaries of the digital data signal 114 can be applied to the electrode 406a, the electrode 406b, the electrode 408a, and/or the electrode 408b of the MZM structure 101'''. In one or more embodiments, the digital data signal 114 is provided by a first SerDes device (e.g., a first SerDes circuit).

Additionally, in one or more embodiments, the digital data signal 214 can be an electrical driving signal for the MZM structure 101'''. For example, the digital data signal 214 can be configured to bias the MZM structure 101''' to facilitate conversion of the optical input signal 110 into the optical output signal 112. In one or more embodiments, the digital data signal 214 can be configured to bias the MZM structure 101''' at an operating point of the MZM structure 101'. In certain embodiments, the digital data signal 214 can be a polybinary electrical signal. For example, in certain embodiments, the digital data signal 214 can be a multi-level partial response signal provided to the MZM structure 101''' where the digital data signal 214 is generated by adding duobinary most significant bits and least significant bits. In certain embodiments, the digital data signal 214 can be provided to the MZM structure 101''' via separate most significant bit and least significant bit duobinary tributaries. For example, in certain embodiments, respective most significant bit and least significant bit duobinary tributaries of the digital data signal 214 can be applied to the electrode 406a, the electrode 406b, the electrode 408a, and/or the electrode 408b of the MZM structure 101'. In one or more embodiments, the digital data signal 214 is provided by a second SerDes device (e.g., a second SerDes circuit). For example, the digital data signal 214 can be a different digital data signal than the digital data signal 114. In one or more embodiments, the digital data signal 114 can be applied to the electrode 406a and the electrode 408a. Furthermore, the digital data signal 214 can be applied to the electrode 406b and the electrode 408b.

Additionally, in one or more embodiments, the redundant digital data signal 116 can be an electrical driving signal for the MZM structure 101'''. For example, the redundant digital data signal 116 can be configured to bias the MZM structure 101''' to facilitate conversion of the optical input signal 110 into the optical output signal 112. In one or more embodiments, the redundant digital data signal 116 can be configured to bias the MZM structure 101 at an operating point of the MZM structure 101'''. In certain embodiments, the redundant digital data signal 116 can be a polybinary electrical signal. For example, in certain embodiments, the redundant digital data signal 116 can be a multi-level partial response signal provided to the MZM structure 101''' where the redundant digital data signal 116 is generated by adding duobinary most significant bits and least significant bits. In certain embodiments, the redundant digital data signal 116 can be provided to the MZM structure 101''' via separate most significant bit and least significant bit duobinary tributaries. For example, in certain embodiments, respective most significant bit and least significant bit duobinary tributaries of the redundant digital data signal 116 can be applied to the electrode 406a, the electrode 406b, the electrode 408a, and/or the electrode 408b of the MZM structure 101'''. In certain embodiments, a certain amount of delay 418a and/or a certain amount of delay 418b can be added to the digital data signal 114, the digital data signal 214, and/or the redundant digital data signal 116. Additionally, in certain embodiments, a driver 420a and/or a driver 420b can be employed to provide the digital data signal 114, the digital data signal 214, and/or the redundant digital data signal 116 to the electrode 406a, the electrode 406b, the electrode 408a, and/or the electrode 408b of the MZM structure 101'''.

FIG. 5 illustrates a system 400' that facilitates optical communications according to one or more embodiments of the present disclosure. The system 400' can be an alternate embodiment of the system 400'. The system 400' includes the MZM structure 101''' and the LUT 402. In certain embodiments, the system 400' also includes the delay 418a, the delay 418b the driver 420a, and/or the driver 420b to facilitate the optical communications. In one or more embodiments, the waveguide 109 of the MZM structure 101''' is configured to receive the optical input signal 110 and an optical input signal 110'. The optical input signal 110' can be a redundant version of the optical input signal 110. For example, the optical input signal 110' can be a redundant optical input signal associated with the optical input signal 110. In one or more embodiments, the optical input signal 110 can be provided to the waveguide interferometer arm structure 102 and the optical input signal 110' can be provided to the waveguide interferometer arm structure 104. For example, in one or more embodiments, the MZM structure 101''' can be configured to provide the optical input signal 110 to the electrode 406a and the electrode 406b to facilitate generation of the optical output signal 112. Furthermore, in one or more embodiments, the MZM structure 101''' can be configured to provide the optical input signal 110' to the electrode 408a and the electrode 408b to further facilitate generation of the optical output signal 112. In various embodiments, the optical input signal 110' can be employed by the MZM structure 101''' to improve quality of the optical output signal 112 and/or to maintain a degree of power for the optical output signal 112.

FIG. 6 illustrates a system 400'' that facilitates optical communications according to one or more embodiments of the present disclosure. The system 400'' can be an alternate embodiment of the system 400. In one or more embodiments, the system 400'' is configured to provide passive optical redundancy to facilitate optical communications. The system 400'' includes an MZM structure 101''''. The MZM structure 101'''' can be an alternate embodiment of the MZM structure 101'''. In one or more embodiments, the MZM structure 101'''' can be a silicon photonic MZM. In one or more embodiments, the MZM structure 101'''' can be configured as a modulator to convert one or more data streams from an electrical domain to an optical domain. For example, in one or more embodiments, the MZM structure 101'''' can be configured as a modulator to convert one or more electrical lanes into one or more optical lanes. The MZM structure 101'''' includes the waveguide interferometer arm structure 102 and the waveguide interferometer arm structure 104. In an embodiment, the waveguide interferometer arm structure 102 can be a top waveguide interferometer arm structure of the MZM structure 101'''' that comprises an electrode 606a, an electrode 606b, an electrode 606c, an electrode 606d, an electrode 606e, and/or an electrode 606f. Furthermore, the waveguide interferometer arm structure 104 can be a bottom waveguide interferometer arm structure of the MZM structure 101"" that comprises an electrode 608a, an electrode 608b, an electrode 608c, an electrode 608d, an electrode 608e, and/or an electrode 608f. The electrode 606a, the electrode 606b, the electrode 606c, the electrode 606d, the electrode 606e, the electrode 606f, the electrode 608a, the electrode 608b, the electrode 608c, the electrode 608d, the electrode 608e, and/or the electrode 608f can apply respective electric fields to the waveguide 109 of the MZM structure 101"" to control phase modulation for the optical input signal 110. In one or more embodiments, the MZM structure 101"" can be employed to provide the optical output signal 112 as a PAM signal with more than four levels such as, for example, a PAM-6 signal, a PAM-8 signal, or another PAM-X signal where X is an integer. In one or more embodiments, a certain amount of delay 618a and/or a driver 620a can be employed to facilitate application of the digital data signal 114 to the electrode 606a and/or the electrode 608a. A certain amount of delay 618b and/or a driver 620b can also be employed to facilitate application of the digital data signal 114 to the electrode 606b and/or the electrode 608b. Furthermore, a certain amount of delay 618c and/or a driver 620c can be employed to facilitate application of the digital data signal 214 to the electrode 606c and/or the electrode 608c. A certain amount of delay 618d and/or a driver 620d can also be employed to facilitate application of the digital data signal 214 to the electrode 606d and/or the electrode 608d. Furthermore, a certain amount of delay 618e and/or a driver 620e can be employed to facilitate application of the redundant digital data signal 116 to the electrode 606e and/or the electrode 608e. A certain amount of delay 618f and/or a driver 620f can also be employed to facilitate application of the redundant digital data signal 116 to the electrode 606f and/or the electrode 608f. In certain embodiments, the electrode 606a, the electrode 606b, the electrode 606c, the electrode 606d, the electrode 606e, the electrode 606f, the electrode 608a, the electrode 608b, the electrode 608c, the electrode 608d, the electrode 608e, and/or the electrode 608f can be respectively tuned to provide equalization for the optical output signal 112 and/or to improve signal integrity of the optical output signal 112.

FIG. 7 illustrates a system 700 that facilitates optical communications according to one or more embodiments of the present disclosure. The system 700 includes a network interface module 702 and/or a network interface controller (NIC) 704. The network interface module 702 can include an MZM structure 701, a laser 706, a SerDes 708a, a SerDes 708b, and/or a SerDes 708c. Furthermore, in one or more embodiments, the network interface module 702 can include and/or can be configured to couple to an optical fiber 710. The network interface module 702 can be, for example, a transceiver device (e.g., an optical transceiver) that facilitates fiber optic communication. In one or more embodiments, the network interface module 702 can be a pluggable optical transceiver with a set of pins to facilitate connection with the optical fiber 710. The optical fiber 710 can be, for example, a fiber optic communication channel (e.g., a transparent fiber optic connection, a fiber optic wire, etc.) that transmits pulses of infrared light.

In an embodiment, the optical fiber 710 includes a single optical communication channel (e.g., a single fiber optic wire). In another embodiment, the optical fiber 710 includes two or more optical communication channels (e.g., two or more fiber optic wires). In another embodiment, the optical fiber 710 can include, additionally or alternatively, a fiber bundle. However, it is to be appreciated that, in certain embodiments, the optical fiber 710 can be implemented in a different manner to facilitate fiber optic communications via the optical fiber 710. In certain embodiments, the optical fiber 710 can be a single mode optical fiber cable. Alternatively, in certain embodiments, the optical fiber 710 can be a multimode optical fiber cable. However, it is to be appreciated that, in certain embodiments, the optical fiber 710 can be implemented as a different type of optical fiber.

The laser 706 can be, for example, an optical transceiver laser. In one or more embodiments, the laser 706 can be configured to emit the optical input signal 110. The optical input signal 110 can be, for example, an optical signal associated with data for transmission via the optical fiber 710. For example, in one or more embodiments, the optical input signal 110 can be an unmodulated optical carrier. In one or more embodiments, the laser 706 can emit the optical input signal 110 at a particular wavelength. In an embodiment, the laser 706, the MZM structure 101, the SerDes 708a, the SerDes 708b, and/or the SerDes 708c can be attached to a substrate such as, for example, a printed circuit board of the network interface module 702.

In certain embodiments, the laser 706 can be configured as a directly modulated laser (DML). In certain embodiments, the laser 706 can be configured as an externally modulated laser (EML). In certain embodiments, the laser 706 can be configured as a vertically coupled laser. Alternatively, in certain embodiments, the laser 706 can be configured as a horizontally coupled laser. In an embodiment, the laser 706 is a semiconductor laser diode that emits the optical input signal 110 vertically with respect to a top surface of the laser 706. For example, in certain embodiments, the laser 706 can be a vertical cavity surface emitting laser (VCSEL). In another embodiment, the laser 706 is a semiconductor laser diode that emits the optical input signal 110 horizontally with respect to a top surface of the laser 706. The optical input signal 110 generated by the laser 706 can be provided to the MZM structure 701. The MZM structure can correspond to the MZM structure 101, the MZM structure 101', the MZM structure 101", the MZM structure 101''', or the MZM structure 101"". As disclosed herein, the MZM structure 701 can generate the optical output signal 112. The optical output signal 112 generated by the MZM structure 701 can be, for example, a modulated optical carrier.

In an embodiment, the NIC 704 can be coupled (e.g., physically coupled and/or communicatively coupled) to the network interface module 702. In another embodiment, the network interface module 702 can include the NIC 704. In an embodiment, the NIC 704 can be configured to manage generation of the optical input signal 110 via the laser 706. For example, in an embodiment, the NIC 704 can be configured to control emission of the optical input signal 110 via the laser 706. In certain embodiments, the NIC 704 can be configured to manage timing of transmission of the optical input signal 110. In another embodiment, the NIC 704 can be configured to select the optical input signal 110 for transmission. In one or more embodiments, the NIC 704 can be configured to manage one or more inputs provided to the laser 706 and/or one or more settings for the laser 706 to facilitate emission of the optical input signal 110 via the laser 706.

Additionally or alternatively, in an embodiment, the NIC 204 can be configured to manage transmission of the digital data signal 114 via the SerDes 708a, transmission of the digital data signal 214 via the SerDes 708b, and/or transmission of the redundant digital data signal 116 via the SerDes 708c. In one or more embodiments, control from the NIC 704 to the network interface module 702 can be realized based on an electrical lane control signal and/or by sending one or more different data streams to the laser 706, the SerDes 708a, the SerDes 708b, and/or the SerDes 708c. In one or more embodiments, the NIC 704 can transmit one or more control signals (e.g., one or more electrical control signals) to the laser 706 to facilitate emission of the optical input signal 110. In one or more embodiments, the NIC 704 can additionally or alternatively configure the laser 706 with certain data to facilitate emission of the optical input signal 110. Additionally or alternatively, in one or more embodiments, the NIC 704 can transmit one or more control signals (e.g., one or more electrical control signals) to the SerDes 708a, the SerDes 708b, and/or the SerDes 708c to facilitate transmission of the digital data signal 114 via the SerDes 708a, transmission of the digital data signal 214 via the SerDes 708b, and/or transmission of the redundant digital data signal 116 via the SerDes 708c.

FIG. 8 illustrates a computing system 800 that may be embedded in a datacenter network system. In some cases, the computing system 800 may be a firmware computing system communicatively coupled with, and configured to control, one or more circuit modules associated with a network interface module (e.g., a transceiver module). For example, the computing system 800 may be a firmware computing system and/or a controller computing system communicatively coupled with one or more circuit modules, such as a network interface module (e.g., the network interface module 702) and/or a NIC (e.g., the NIC 704). The computing system 800 may include or otherwise be in communication with a processor 810, a memory circuitry 820, and communication circuitry 830. In some embodiments, the processor 810 (which may include multiple or co-processors or any other processing circuitry associated with the processor) may be in communication with the memory circuitry 820. The memory circuitry 820 may comprise non-transitory memory circuitry and may include one or more volatile and/or non-volatile memories. In some examples, the memory circuitry 820 may be an electronic storage device (e.g., a computer readable storage medium) configured to store data that may be retrievable by the processor 810. In some examples, the data stored in the memory 820 may include communication protocol data, or the like for enabling the apparatus to carry out various functions or methods in accordance with embodiments of the present invention, described herein.

In some examples, the processor 810 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 810 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multi-threading. In some embodiments, the processor 810 is a microprocessor.

In an example embodiment, the processor 810 may be configured to execute instructions, such as computer program code or instructions, stored in the memory circuitry 820 or otherwise accessible to the processor 810. Alternatively or additionally, the processor 810 may be configured to execute hard-coded functionality. As such, whether configured by hardware or software instructions, or by a combination thereof, the processor 810 may represent a computing entity (e.g., physically embodied in circuitry) configured to perform operations according to an embodiment of the present invention described herein. For example, when the processor 810 is embodied as an ASIC, FPGA, or similar, the processor may be configured as hardware for conducting the operations of an embodiment of the invention. Alternatively, when the processor 810 is embodied to execute software or computer program instructions, the instructions may specifically configure the processor 810 to perform the algorithms and/or operations described herein when the instructions are executed. However, in some cases, the processor 810 may be a processor of a device (e.g., a mobile terminal or a fixed computing device) specifically configured to employ an embodiment of the present invention by further configuration of the processor using instructions for performing the algorithms and/or operations described herein. The processor 810 may further include a clock, an arithmetic logic unit (ALU) and logic gates configured to support operation of the processor 810, among other things.

The computing system 800 may optionally also include the communication circuitry 830. The communication circuitry may be any means embodied in either hardware or a combination of hardware and software that is configured to receive and/or transmit data from/to a network and/or any other device or module in communication with the computing system 800. In this regard, the communication interface may include, for example, supporting hardware and/or software for enabling communications. As such, for example, the communication circuitry 830 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system, comprising:
a Mach-Zehnder modulator (MZM) structure that comprises:
a first waveguide interferometer arm structure that comprises a first segmented electrode associated with at least a first electrode and a second electrode; and
a second waveguide interferometer arm structure that comprises a second segmented electrode associated with at least a third electrode and a fourth electrode,
wherein the MZM structure is configured to convert an optical input signal into an optical output signal through application of a digital data signal to the first electrode of the first waveguide interferometer arm structure and the third electrode of the second waveguide interferometer arm structure and application of a redundant digital data signal to the second electrode of the first waveguide interferometer arm structure and the fourth electrode of the second waveguide interferometer arm structure.

2. The system of claim 1, wherein the first segmented electrode and the second segmented electrode are configured to maintain a degree of power between the optical input signal and the optical output signal.

3. The system of claim 1, wherein the optical output signal is an optical non-return-to-zero (NRZ) signal.

4. The system of claim 1, wherein a size of the first electrode corresponds to a size of the second electrode.

5. The system of claim 1, wherein a bias of the first electrode corresponds to a bias of the second electrode.

6. The system of claim 1, wherein a size of the third electrode corresponds to a size of the fourth electrode.

7. The system of claim 1, wherein a bias of the third electrode corresponds to a bias of the fourth electrode.

8. The system of claim 1,
wherein the digital data signal is a first digital data signal,
wherein the first segmented electrode of the first waveguide interferometer further comprises a fifth electrode and the second segmented electrode of the second waveguide interferometer further comprises a sixth electrode, and
wherein the MZM structure is further configured to convert the optical input signal into the optical output signal through application of a second digital data signal to the fifth electrode of the first waveguide interferometer arm structure and the sixth electrode of the second waveguide interferometer arm structure.

9. The system of claim 1, wherein the optical output signal is an optical pulse amplitude modulation (PAM) signal.

10. A system, comprising:
a look-up table configured to provide an output digital data signal based on selection of a digital data signal or a redundant digital data signal; and
a Mach-Zehnder modulator (MZM) structure that comprises:
a first waveguide interferometer arm structure that comprises at least a first electrode; and
a second waveguide interferometer arm structure that comprises at least a second electrode,
wherein the MZM structure is configured to convert an optical input signal into an optical output signal through application of the output digital data signal to the first electrode of the first waveguide interferometer arm structure and the second electrode of the second waveguide interferometer arm structure.

11. The system of claim 10, wherein the selection of the digital data signal or the redundant digital data signal is provided to maintain a degree of power between the optical input signal and the optical output signal.

12. The system of claim 10, wherein the optical output signal is an optical non-return-to-zero (NRZ) signal.

13. The system of claim 10,
wherein the first waveguide interferometer arm structure further comprises a third electrode and the second waveguide interferometer arm structure further comprises a fourth electrode, and
wherein the MZM structure is further configured to convert the optical input signal into the optical output signal through application of the output digital data signal to the third electrode of the first waveguide interferometer arm structure and the fourth electrode of the second waveguide interferometer arm structure.

14. The system of claim 13, wherein the third electrode and the fourth electrode are configured to maintain a degree of power between the optical input signal and the optical output signal.

15. The system of claim 13, wherein a size of the first electrode is different than a size of the third electrode.

16. The system of claim 13, wherein a size of the second electrode is different than a size of the fourth electrode.

17. The system of claim 10, wherein the look-up table is configured to provide the output digital data signal based on selection of the digital data signal, the redundant digital data signal, or another digital data signal.

18. The system of claim 10, wherein the optical input signal is provided to the first waveguide interferometer arm structure and the redundant optical input signal is provided to the second waveguide interferometer arm.

19. The system of claim 10, wherein the optical output signal is an optical pulse amplitude modulation (PAM) signal.

20. A system, comprising:
a Mach-Zehnder modulator (MZM) structure that comprises:
a first waveguide interferometer arm structure that comprises a first segmented electrode associated with at least a first electrode, a second electrode, and a third electrode;
a second waveguide interferometer arm structure that comprises a second segmented electrode associated with at least a fourth electrode, a fifth electrode, and a sixth electrode,
wherein the MZM structure is configured to convert an optical input signal into an optical output signal through application of a first digital data signal to the first electrode of the first waveguide interferometer arm structure and the fourth electrode of the second waveguide interferometer arm structure, application of a second digital data signal to the second electrode of the first waveguide interferometer arm structure and the fifth electrode of the second waveguide interferometer arm structure, and application of a redundant digital data signal to the third electrode of the first waveguide interferometer arm structure and the sixth electrode of the second waveguide interferometer arm structure.

* * * * *